US012306432B1

(12) United States Patent
Vasylyev

(10) Patent No.: US 12,306,432 B1
(45) Date of Patent: *May 20, 2025

(54) METHOD OF MAKING THIN LIGHT GUIDE ILLUMINATION SYSTEMS USING SIDE-EMITTING LEDS

(71) Applicant: Sergiy Victorovich Vasylyev, Elk Grove, CA (US)

(72) Inventor: Sergiy Victorovich Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,474

(22) Filed: Nov. 17, 2023

Related U.S. Application Data

(63) Continuation of application No. 17/485,498, filed on Sep. 27, 2021, now Pat. No. 11,821,621, which is a (Continued)

(51) Int. Cl.
F21V 8/00 (2006.01)
F21V 7/00 (2006.01)
(Continued)

(52) U.S. Cl.
CPC ......... *G02B 6/0065* (2013.01); *G02B 6/0016* (2013.01); *G02B 6/0035* (2013.01);
(Continued)

(58) Field of Classification Search
CPC .... G02B 6/0023; G02B 6/0025; G02B 6/003; G02B 6/0095; G02B 6/006; G02B 6/34;
(Continued)

(56) References Cited

U.S. PATENT DOCUMENTS 3,719,906 A 3/1973 Tournois
3,883,221 A 5/1975 Rigrod
(Continued)

FOREIGN PATENT DOCUMENTS

CN 102121639 7/2011
FR 2843806 2/2004
WO 2013036192 A1 3/2013

*Primary Examiner* — William N Harris
*Assistant Examiner* — James M Endo

(57) ABSTRACT

A method of making a thin waveguide illumination system using side-emitting LED packages is disclosed. The method includes providing an optically transmissive sheet with first and second broad-area surfaces, a light coupling area near the first edge, and a two-dimensional light extraction area on at least one of these surfaces. This light extraction area includes a plurality of light extraction elements with variable density. An LED strip having a heat-conducting printed circuit and a linear array of side-emitting LED packages is positioned parallel to the first edge at or near the first edge, with the major surface of the heat-conducting printed circuit extending generally parallel to the first and second broad-area surfaces. A broad-area reflector is positioned parallel to the second broad-area surface of the sheet. The density of the light extraction elements within the two-dimensional light extraction area increases with distance from the light coupling area.

40 Claims, 13 Drawing Sheets

Related U.S. Application Data continuation of application No. 17/203,663, filed on Mar. 16, 2021, now Pat. No. 11,156,340, which is a continuation of application No. 16/828,941, filed on Mar. 24, 2020, now Pat. No. 10,962,197, which is a continuation of application No. 16/016,595, filed on Jun. 23, 2018, now Pat. No. 10,605,431, which is a continuation of application No. 13/766,698, filed on Feb. 13, 2013, now Pat. No. 10,030,846.

(60) Provisional application No. 61/598,854, filed on Feb. 14, 2012.

(51) Int. Cl.
  *G09F 13/04* (2006.01)
  *G09F 13/18* (2006.01)

(52) U.S. Cl.
  CPC ......... *G02B 6/0073* (2013.01); *G02B 6/0096* (2013.01); *F21V 7/0091* (2013.01); *F21V 2200/20* (2015.01); *G02B 6/0015* (2013.01); *G02B 6/0023* (2013.01); *G02B 6/0025* (2013.01); *G02B 6/0028* (2013.01); *G02B 6/0031* (2013.01); *G02B 6/0068* (2013.01); *G02B 6/0075* (2013.01); *G02B 6/0076* (2013.01); *G02B 6/0095* (2013.01); *G09F 13/049* (2021.05); *G09F 13/18* (2013.01)

(58) Field of Classification Search
  CPC .. G02B 6/4214; G02B 6/3528; G02B 6/3524; G02B 6/0031; G02B 6/0018; G02B 6/002; G02B 6/0015; G02B 6/0076; G02B 6/421; G02B 6/009; G02B 6/0075; G02B 6/008; G02B 6/0091; G02B 6/0028; G02B 6/0021; G02B 6/0073; G02B 6/0058; G02B 6/0061; G02B 6/0068; G09F 2013/049; G09F 2013/1809; G09F 2013/1813; G09F 2013/1818; G09F 2013/1827; G09F 2013/1831; G09F 2013/1836; G09F 13/02; G09F 13/04; G09F 13/18; G06F 3/0421; G06F 2203/04109; F21V 2200/20; F21V 7/0091
  See application file for complete search history.

(56) References Cited

U.S. PATENT DOCUMENTS

| | | | |
|---|---|---|---|
| 5,390,436 A | 2/1995 | Ashall | |
| 5,745,266 A | 4/1998 | Smith | |
| 6,193,383 B1 | 2/2001 | Onikiri et al. | |
| 6,529,318 B1 | 3/2003 | Kaneda et al. | |
| 6,594,420 B1 | 7/2003 | Lange et al. | |
| 6,640,029 B1 | 10/2003 | Prejzek | |
| 6,724,508 B2 | 4/2004 | Pierce et al. | |
| 6,883,919 B2 | 4/2005 | Travis | |
| 7,163,331 B2 | 1/2007 | Suzuki et al. | |
| 7,252,399 B2 | 8/2007 | Ferri et al. | |
| 7,287,892 B1* | 10/2007 | Pang | G02B 6/0021 362/604 |
| 7,432,893 B2 | 10/2008 | Ma et al. | |
| 7,524,098 B2 | 4/2009 | Vennetier et al. | |
| 7,535,638 B2 | 5/2009 | Kuo et al. | |
| 7,613,373 B1 | 11/2009 | DeJong | |
| 7,957,082 B2 | 6/2011 | Mi et al. | |
| 7,965,917 B2 | 6/2011 | Yoshikawa et al. | |
| 8,128,271 B2 | 3/2012 | Nichol | |
| 8,317,352 B2 | 11/2012 | Saccomanno | |
| 10,962,197 B2 | 3/2021 | Vasylyev | |
| 11,156,340 B2 | 10/2021 | Vasylyev | |
| 11,821,621 B2* | 11/2023 | Vasylyev | G02B 6/0031 |
| 2003/0184499 A1 | 10/2003 | Miyashita | |
| 2003/0210537 A1* | 11/2003 | Engelmann | H03K 17/96 362/276 |
| 2004/0252091 A1 | 12/2004 | Ma et al. | |
| 2006/0021267 A1 | 2/2006 | Matsuda et al. | |
| 2006/0087840 A1 | 4/2006 | Franklin et al. | |
| 2006/0215387 A1 | 9/2006 | Wang et al. | |
| 2006/0221638 A1 | 10/2006 | Chew et al. | |
| 2007/0081360 A1 | 4/2007 | Bailey et al. | |
| 2007/0109764 A1 | 5/2007 | Bienick | |
| 2007/0116424 A1 | 5/2007 | Ting et al. | |
| 2007/0121342 A1 | 5/2007 | Tamura et al. | |
| 2007/0183040 A1* | 8/2007 | Sinyugin | G02B 6/0041 359/515 |
| 2007/0183161 A1 | 8/2007 | Curran | |
| 2007/0274096 A1 | 11/2007 | Chew et al. | |
| 2007/0274099 A1 | 11/2007 | Tai et al. | |
| 2008/0049449 A1 | 2/2008 | Liu et al. | |
| 2008/0094854 A1 | 4/2008 | Coleman et al. | |
| 2008/0170414 A1* | 7/2008 | Wang | G02B 6/0028 362/612 |
| 2008/0175022 A1* | 7/2008 | Sugiura | G02B 6/0091 362/609 |
| 2008/0260328 A1 | 10/2008 | Epstein | |
| 2009/0027588 A1 | 1/2009 | Medendorp, Jr. et al. | |
| 2009/0067194 A1 | 3/2009 | Sanchez | |
| 2009/0077847 A1* | 3/2009 | Hsieh | G09F 13/18 40/546 |
| 2010/0111515 A1 | 5/2010 | Saitoh et al. | |
| 2010/0124074 A1 | 5/2010 | Brychell | |
| 2010/0142224 A1* | 6/2010 | Zhang | G02B 6/0043 362/317 |
| 2010/0202128 A1 | 8/2010 | Saccomanno | |
| 2010/0214281 A1 | 8/2010 | Ueno et al. | |
| 2010/0214802 A1 | 8/2010 | Masuda et al. | |
| 2010/0220956 A1* | 9/2010 | Saarikko | G02B 6/0028 385/37 |
| 2010/0259948 A1 | 10/2010 | Chang | |
| 2011/0019436 A1 | 1/2011 | Van Den Berge | |
| 2011/0043490 A1* | 2/2011 | Powell | G06F 3/0421 345/176 |
| 2011/0099864 A1 | 5/2011 | Bryan et al. | |
| 2011/0267563 A1 | 11/2011 | Shimizu | |
| 2011/0286237 A1 | 11/2011 | Tanoue et al. | |
| 2012/0106147 A1 | 5/2012 | Kim et al. | |
| 2012/0182497 A1 | 7/2012 | Qi | |
| 2012/0328242 A1 | 12/2012 | Hesse | |
| 2013/0033895 A1* | 2/2013 | Brown | G02B 6/0011 703/1 |
| 2013/0300716 A1 | 11/2013 | Craven-Bartle et al. | |

* cited by examiner

METHOD OF MAKING THIN LIGHT GUIDE ILLUMINATION SYSTEMS USING SIDE-EMITTING LEDS

CROSS-REFERENCE TO RELATED APPLICATIONS

This application is a continuation of U.S. patent application Ser. No. 17/485,498, filed Sep. 27, 2021, which is a continuation of U.S. patent application Ser. No. 17/203,663, filed Mar. 16, 2021, which is a continuation of U.S. patent application Ser. No. 16/828,941, filed Mar. 24, 2020, which is a continuation of U.S. patent application Ser. No. 16/016,595, filed Jun. 23, 2018, which is a continuation of U.S. patent application Ser. No. 13/766,698, filed Feb. 13, 2013, which claims priority from U.S. provisional application Ser. No. 61/598,854 filed on Feb. 14, 2012, the disclosure of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to planar light emitting waveguides such planar plate or slab waveguides distributing light along the broad surface of the plate and emitting the distributed light from the broad-area plate surface. This invention also relates to an apparatus and method of inputting light into a planar waveguide through its face as opposed to edge-lit light guide panels where light is input through one of the waveguide edges. More particularly, this invention relates to panel luminaires, illuminated panel signs, illuminated window pane signs, front lights, backlights, lighting panels, LCD display backlights, computer screens, advertising displays, road signs, and the like, as well as to a method for redistributing light from a variety of light sources.

2. Description of Background Art

Conventionally, light emitting devices employing a planar waveguide include an optically transmissive plate, a light source coupled to the plate's edge and a series of optical features distributed along a major surface of the plate for extracting light at predetermined locations of the surface.

However, a number of applications exist where edges of the waveguide are not accessible or it is otherwise impractical to input light through an edge. Furthermore, many existing structural or artistic articles which can provide light guiding and distribution functions are not always readily transformable to edge-lit applications. Typical examples include framed glass windows of building facades and doors, storefront window panes, as well as various interior and exterior architectural features employing transparent glass or plastic panels.

Other examples of common objects which could be used as planar waveguides but may not be suitable for light input from an edge include but are not limited to planar slabs of glass or transparent plastic which edges are roughened or sanded. In a yet further example, the edges of some transparent slabs or panels may be tapered making it difficult to input light from a relatively large source. The light input aperture of edges may also be too small compared to the size of the light source due to the insufficient thickness of the transparent slab or panel.

It is therefore an object of this invention to provide an improved illumination system providing an efficient light input through a face of a planar waveguide as opposed to light input through an edge. It is another object of this invention to provide a convenient light injection into a planar waveguide, such as an existing window pane of a building, through its face, without having to penetrate into the waveguide's surface. It is yet another object of this invention to provide convenient light input in one area of a major surface of a planar waveguide and light extraction from the waveguide in another area of the surface. It is yet another object of this invention to provide an improved method of coupling light to a planar waveguide without having to access its edges and while substantially reducing or eliminating the unwanted light spillage due to the coupling. Other objects and advantages of this invention will be apparent to those skilled in the art from the following disclosure.

BRIEF SUMMARY OF THE INVENTION

Accordingly, the present invention is directed to face-lit planar waveguide illumination systems which may be employed to redistribute light emitted by a compact light source over a large area of the planar waveguide and re-emit at least a portion of the distributed light from a major surface of the waveguide. More particularly, this invention is directed to a system for injecting light into the face of a planar plate, slab or substrate of an optically transmissive material in one area and extracting at least some of the injected light from another area of the plate or substrate.

The present invention solves a number of problems associated with light distribution and illumination using planar waveguides by providing a face-lit solution which is not hindered by the limitations of conventional edge-lit illumination devices requiring the access to waveguide edges or surface penetration for enabling light input.

An advantage of the present system is to provide controlled light input trough a face of the planar waveguide in one location so that such light can be propagated along the waveguide in response to the optical transmission and a total internal reflection generally towards at least one well-defined direction and can then be extracted from another location of the waveguide along said direction.

Light is injected into the planar waveguide by means of an elongated (linear) optical element attached to a face of the waveguide and optically coupled to said face.

According to one aspect of the invention, light is input into a face or broad—are surface the planar waveguide non-invasively and without penetrating into the waveguide's body. According to another aspect of the invention, a linear configuration of the optical element allows for coupling light into the waveguide from a linear light source which may be represented by an elongated light-emitting element or a linear array of compact light-emitting elements. According to yet another aspect, the linear configuration of the light coupling optical element may also be used for injecting light into the waveguide from a discrete light source optically coupled to a terminal end of the optical element.

In at least one embodiment, the invention features a planar optical waveguide exemplified by a portion of an optically transmissive window pane, a linear light coupling optical element attached to a planar face or major broad-area surface of the pane and a linear light source. The light source includes a strip light emitting diodes (LEDs) incorporated is a linear array. The linear LED array is positioned generally parallel to the longitudinal axis of linear optical element and is configured to illuminate the optical element with a beam of light. The linear optical element is optically coupled to the face of the window pane by means of a planar surface and by providing a good optical contact between the surface and the face of the window pane.

The optical element is configured to inject light into the medium of the window pane at a sufficiently low out-of-plane angle permitting for the subsequent light propagation within by means of a total internal reflection from the opposing faces of the pane. According to an aspect of the present invention, the optical element injects light into the waveguide mode while directing the light beam towards a well-defined direction along the window pane so that the injected light can be mixed along the propagation path and then extracted at another location of the window pane.

In at least one embodiment, the invention includes one or more light extracting features positioned along the prevailing path of light propagation in the waveguide. The light extracting features are configured to extract light from the waveguide and direct such light towards a surface perpendicular. According to an aspect of the invention, at least a portion of the extracted light may be directed away from the waveguide and towards a viewer thus providing conspicuous visibility of the light extracting features.

In at least one embodiment, the invention includes a linear collimating element optically coupled to the light source. Various implementations of the collimating element include linear or axisymmetrical refractive lenses, TIR lenses, reflectors, concentrators, and any combinations thereof.

Various implementation of the light coupling optical element include forming at least a part of the element from an elongated block of transparent material. In one implementation, the elongated block has a shape of a right-angle prism or wedge. In one implementation, the elongated block has at least one planar surface or at least one curvilinear surface. In one implementation, the elongated block has a triangular transversal cross-section. In one implementation, the elongated block has a trapezoidal transversal cross-section. In further implementations, the optical element has sharply asymmetrical and axisymmetrical configurations in a transversal cross-section. Various faces or surfaces of the optical element may be configured for refracting light and/or for reflecting light by means of a specular reflection or TIR.

In at least one embodiment the light coupling optical element includes a strip of a film material laminated onto the face of the waveguide. Various implementations of such optical element include prismatic films, holographic films, diffractive films, and any other types of light turning films which may be used for suppressing the refraction at the waveguide surface or for injecting light into waveguide at angles allowing for TIR propagation.

Various implementations of the face-lit waveguide illumination system include suitable housing components and means for blocking stray light.

In at least one embodiment of the invention, the width of the linear optical element is defined by the thickness of the planar waveguide. According one specific implementation, the width of the optical contact area of the linear optical element with a major surface of the waveguide is approximately equal to or less than $2d/\sqrt{n^2-1}$, where d is the thickness of the waveguide and n is the refractive index of the waveguide's medium. According to other specific implementations, the transversal width of the light coupling optical element is less than two times the thickness of the planar waveguide and more preferably, 1.8 times the thickness of a glass window pane.

In at least one embodiment, the light source is selected from the group of light emitting elements including fluorescent lamps, linear arrays of light emitting diodes, incandescent lamps, cold-cathode or compact fluorescent lamps, halogen, mercury-vapor, sodium-vapor, metal halide, electroluminescent lamps or sources, field emission devices, and lasers.

In at least one embodiment, the face-lit waveguide illumination system includes the light coupling optical element made from light transmitting material and having the shape of a linear rod or bar. Such rod or bar may have various cross-sections including but not limited to square, rectangular, triangular, pentagonal, hexagonal, octagonal, trapezoidal, circular, half-circular, and oval. The cross-section may also include circular segments or sectors.

In at least one embodiment, the optical element includes an optically transmissive light turning or light redirecting film. Various implementations of such film include microstructured prismatic films, diffractive films, holographic films, and films with internal light redirecting structures.

In at least one embodiment, the illumination system includes means for extracting light from the planar waveguide. In one implementation, the light extracting means include light scattering or light diffusing features. Such features may be embedded into the waveguide's body formed in a surface of the waveguide or externally attached to the waveguide surface. In other implementations, the light extracting means include a textured surface, indicia and or an image print.

In at least one embodiment, the light coupling optical element may be configured with wave guiding properties. In different implementations, it may be formed by a relatively long elongated body of a light transmitting material or include one or more optical fibers.

In at least one embodiment, the light coupling optical element is attached to the face of the waveguide by means of an intermediate film which may have a substantially larger area than the contact area of the optical element. In at least one embodiment, the optical element is attached either directly to the face of the waveguide or to the intermediate film or plate using an optically clear adhesive or encapsulant.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
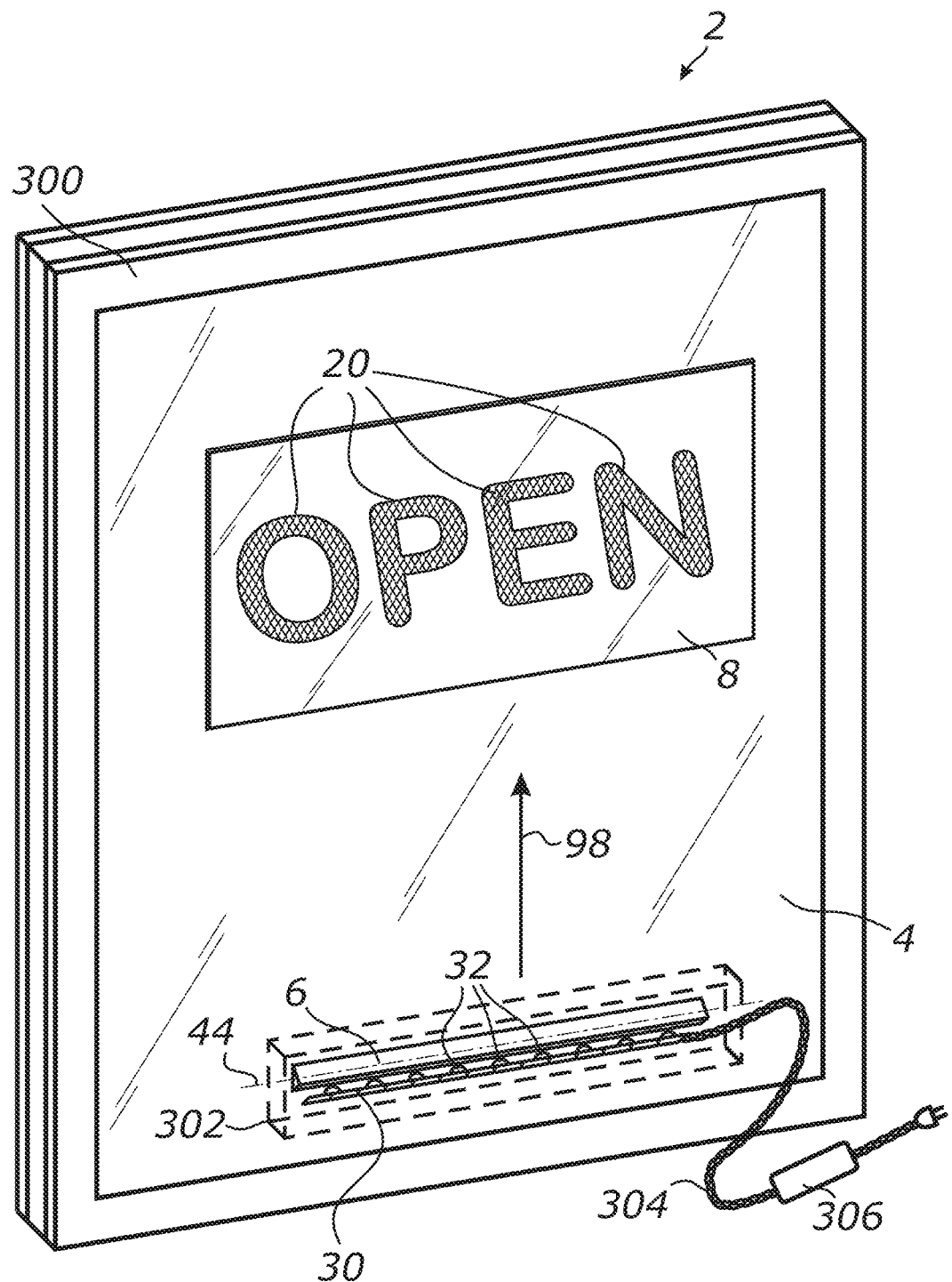
FIG. 1 is a schematic perspective view of a face-lit waveguide illumination system, according to at least one embodiment of the present invention.

Referring more specifically to the drawings, for illustrative purposes the present invention is embodied in the system generally shown in the preceding figures. It will be appreciated that the system may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection and distribution of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

Furthermore, many applications exist for the present invention in relation to distributing light by means of a planar optical waveguide which hereinafter may also be referenced to as a light guide. The planar optical waveguide refers to a broad class of objects employing an optically transmissive material confined between two opposing broad surfaces which are substantially parallel to each other. The term substantially parallel generally includes cases when the opposing surfaces are parallel within a predetermined accuracy, particularly including the cases when the body of the material defined by the above surfaces has a slightly tapered shape or has a variable thickness across the surface.

According to the present invention, the planar waveguide may be exemplified by a transparent plate, slab, panel, pane, light-transmitting substrate or any suitable sheetform of an optically transmissive material. This invention is also applicable to any two-dimensional shape variations of the sheetforms, including but not limited to a rectangle, a polygon, a circle, a strip, a freeform, or any combination therein. This invention is further applicable to any three-dimensional shapes that can be obtained by bending the sheetforms accordingly, including but not limited to cylindrical or semi-cylindrical shapes, conical shapes, corrugated shapes, and the like.

The present invention seeks to provide illumination systems capable of coupling light into a planar waveguide through its broad-area front or back surface in one location and extracting the coupled light at a different location of the waveguide.

According to the present invention, there is provided an illumination system employing a waveguide exemplified by an optically transmissive panel which may also hereinafter be referred to as a light guide panel or LGP. The panel is made from a material which has a refractive index greater than that of the outside medium and is therefore inherently capable of guiding light within the panel by means of a Total Internal Reflection (TIR) from its opposing broad surfaces, provided that the internal incidence angles onto either of the surfaces are greater than a critical angle of TIR characterizing the surfaces.

For the purpose of this discussion, the term "incidence angle" of a light ray in relation to a surface generally refers to an angle that this ray makes with respect to a normal to that surface. It will be appreciated by those skilled in the art of optics that, when referring to light or other waves passing through a boundary formed between two different refractive media, such as air and glass, for example, the ratio of the sines of the angles of incidence and of refraction is a constant that depends on the ratio of refractive indices of the media (the Snell's law of refraction). The following relationship can describe a light bending property of an interface between two refractive media: $n_I \sin \phi_I = n_R \sin \phi_R$, where $n_I$ and $n_R$ are the respective refractive indices of the materials forming the optical interface and $\phi_I$ and $\phi_R$ are the angle of incidence and the angle of refraction, respectively. It will be further appreciated that such optical interface can also be characterized by a critical TIR angle which is the value of $\phi_I$ for which $\phi_R$ equals 90°. Accordingly, for a surface characterized by a stepped drop in refractive index along the propagation path of a ray, the incidence angle may be less than, equal to, or greater than the TIR angle at the given surface.

A TIR angle $\phi_{TIR}$ can be found from the following expression:

$$\varnothing_{TIR} = \arcsin(n_R/n_I \sin 90°) = \arcsin(n_R/n_I) \quad \text{(Equation 1)}$$

In an exemplary case of the interface between glass with the reflective index $n_I$ of about 1.51 and air with $n_R$ of about 1, $\phi_{TIR}$ is approximately equal to 41.5°.

It will be appreciated that, once light is input into the planar light guide, such as LGP, and its propagation angles permit for TIR to occur at LGP's longitudinal walls, the light becomes trapped in LGP and can propagate considerable distances until it is extracted, absorbed or reached an edge of the panel.

The present invention will now be described by way of example with reference to the accompanying drawings.

FIG. 1 depicts an embodiment of a face-lit waveguide illumination system 2 in accordance with the invention. System 2 includes a planar light guide exemplified by a rectangular glass window pane 4 which is mounted within a rigid frame 300. Window pane 4 thus has two opposing parallel broad-area surfaces which are exposed to the air and four edges which are conventionally covered by frame 300.

While there are many uses for the face-lit illumination system of this invention, the embodiments described here are directed particularly to using various optically transparent panels or panes which are parts of the existing exterior or interior structures and/or decorative elements of buildings. Useful examples of such panels include but are not limited to framed or unframed vertical wall windows, door windows, glass or transparent-plastic facades of buildings, glazed openings in walls and ceilings, vertical or horizontal interior space partitions, screens, and the like. It will be appreciated that such types of panels, albeit often providing a good optical transparency, are not commonly designed for illumination purposes. Yet, many of them represent convenient existing structures which are highly transparent and shaped in the form of a plate having smooth broad-area surfaces, which can make them usable for illumination purposes or for providing various lighting effects to an observer. It is therefore an object of this invention to provide means for utilizing such already existing optically-transmissive structures as planar optical waveguides transporting light from one location to another so that light can be injected into the face of the respective waveguide, distributing such light through the waveguide's body and emit the injected light from another location of the waveguide without having to access its edges for light input.

Accordingly, by way of example and not limitation, window pane 4 may be of the type typically found in single-pane or dual-pane windows or doors of the residential or commercial buildings. In another non-limiting example, window pane 4 may be a part of a storefront window in a shopping mall. It will be appreciated that such windows or doors, although being typically transparent and optically clear, generally have at least some or all of the edges of the window pane covered with a frame and are therefore not suitable for conventional, edge-lit applications.

System 2 of FIG. 1 further includes a light coupling optical element 6 made from an optically transmissive material and configured for injecting light into pane 4 through its face as opposed to injecting light through an edge in edge-lit illumination systems. Optical element 6 is attached to one of the two opposing broad-area surfaces or faces of window pane 4 and is optically coupled to the pane with refractive index matching. According to the preferred embodiments, it is important that optical element 6 is attached to the face of window pane 4 externally, that is without surface penetration.

The term "optically coupled" is directed to mean any relationship between two optical components which enables light to pass from one optical component to the other without being redirected back or absorbed. The term "refractive index matching", in relationship to an optical coupling, is directed to mean such optical coupling between two refractive optical components where the refractive indices of both components are selected to approximate each other.

In the context of the present invention, index matching may serve a congruence of goals. One particular goal of the index matched optical coupling is reducing or eliminating the Fresnel reflections at the respective optical interface in a broad range of incidence angles. Another goal may be eliminating or suppressing TIR in an exemplary case where the refractive index of a first optical element is less than that of the second optical element and where the light is designed to propagate from the first element to the second element. In this case, the proper index matching should ensure that no TIR will occur at the respective optical interface within the designed range of incidence angles and that essentially all of the light will be transmitted to the second optical element. It should be understood that index matching generally precludes forming any air gap between the two refractive optical elements.

For the purpose of this invention and from the practical standpoint, two optical elements may also be considered optically coupled with index matching when they are disposed in a tight optical contact, directly or through one or more intermediate optical layers, and when the light-receiving optical element has a greater refractive index than the light-emitting component or, if lower, when the differences between the refractive indices are less than a predefined sufficiently small amount.

According to one embodiment, optical element 6 may be glued to the surface of pane 4 using an optically clear adhesive which refractive index is greater or approximately equal to the refractive index of the material of element 6. The adhesive may have a relatively high tack for permanent bond or a relatively low tack permitting for the eventual removal of element 6 from pane 4. According to one embodiment, optical element 6 may be coupled to pane 4 using an intermediate optically clear substrate which has a similar refractive index and which, in turn, is attached to the surface of pane 5 with a good optical contact.

Referring further to FIG. 1, optical element 6 has an elongated shape with a longer dimension being substantially greater than the shorter dimensions and is exemplified by a linear prism having a triangular transversal cross-section. Suitable materials for making such linear prism include but are not limited to water-clear glass, Poly(methyl methacrylate) (PMMA), polycarbonate, styrene, cured urethane, silicone, and the like. Optical element 6 is positioned near a bottom edge of window pane 4 with its longitudinal axis 44 aligned generally parallel to the bottom edge of the pane and perpendicular to an intended prevailing direction 98 of light propagation. In the case illustrated in FIG. 1, direction 98 generally points from the bottom edge of pane 4 towards its top edge.

It is noted that the illustrated position and orientation of optical element 6 with respect to the edges of pane 4 should not be constructed as limiting this invention in any way. Element 6 may also be positioned at any other location of the optically transmissive surface of pane 4. Particularly, element 6 may be located at and aligned with respect to any other edge of pane 4, including the vertical edges and the top edge. In one embodiment, optical element 6 may also be located at a considerable distance from all of the edges, including the case when it is located near the center of pane 4. Additionally, linear optical element 6 may also be disposed in any other suitable orientation of its longitudinal axis 44 with respect to the edges of pane 4, including perpendicular and angular positions.

Referring yet further to FIG. 1, system 2 additionally includes a light source 30 exemplified by a linear array or a strip of light emitting diodes 32 illuminating at least one longitudinal face of the prism that forms optical element 6. Optical element 6 is designed to intercept at least a substantial portion of light emitted by source 30 and communicate such light into pane 4 so that light source 30 becomes optically coupled to pane 4 by means of element 6.

It should be understood that light source 30 is not limited to light emitting diodes (LEDs) and may include any suitable single or multiple light sources of any known type, including but not limited to: fluorescent lamps, incandescent lamps, cold-cathode or compact fluorescent lamps, halogen, mercury-vapor, sodium-vapor, metal halide, electroluminescent lamps or sources, field emission devices, lasers, etc. In a linear configuration, light source 30 may comprise a single linear light-emitting element or may include two or more compact light emitting elements incorporated into a linear array. When light source 30 includes multiple light emitting elements, each of such elements may have any suitable shape, including compact or extended two-dimensional or one-dimensional (elongated) shapes.

Light source 30 may further include integrated or external optics such as collimating or light-redistributing lenses, mirrors, lens arrays, mirror arrays, light diffusers, waveguides, optical fibers and the like. When multiple light emitting elements are employed, each of such elements may be provided with individual optics. Alternatively, a single linear optic may be provided for the entire array to collimate light or otherwise shape the emitted beam in a plane which is perpendicular to the longitudinal axis of the array.

Referring yet further to FIG. 1, an optional housing 302 may be provided to cover or encase light source 30 and/or optical element 6. By way of non-limiting example, housing 302 may have different functions including but not limited to structural, protective (from dust, moisture, elements, impact, etc.) and/or aesthetic.

Light source 30 may be provided or associated with an electric power source exemplified by an AC/DC power supply 306 connected to source 30 and an AC power grid using an electric cord 304. The power source may comprise any conventional power sources used to power various light sources. The power sources may include, for example, one or more electric power supplies, batteries, transformers, LED drivers, various other types of voltage and/or current converters or power conditioning units.

System 2 further includes a light emitting component attached to a face of pane 4 and including one or more light extracting features 20. Light extracting features 20 may include any light redirecting structure or device configured for extracting light from pane 4.

In an embodiment illustrated in FIG. 1, the light emitting component is exemplified by a rectangular piece of optically transmissive film 8 applied to a surface of pane 4. Light extracting features 20 are exemplified by light-scattering areas formed in or attached to film 8. Each of the light-scattering areas has a two-dimensional shape or outline representing an individual letter so that the series of light-scattering areas represent the word "OPEN".

It should be understood, however, that the light emitting areas are not limited to letters, words or characters and may have any other two-dimensional shapes which, in turn, may be arranged in any suitable manner. By way of non-limiting examples, features 20 may also represent any geometric shapes, symbols, indicia, images or patterns. Alternatively, features 20 may represent no particular shape or pattern and may simply provide a uniform or non-uniform glow for illumination or visual effect function.

Film 8 may be applied to the same face of pane 4 as the optical element 6 or to the opposing face. Film 8 should be applied to the respective face with a good optical contact which should be sufficient to enable the interaction of light that may propagate in pane 4 with features 20.

The attachment of film 8 to the face of pane 4 may involve the process of lamination with or without adhesive. When no adhesive is used, the material of film 8 should preferably have static cling properties and the contacting surface of film 8 should preferably be calendered to prevent unwanted delamination. In an alternative, film 8 may be laminated onto pane 4 using an optically transmissive adhesive layer. Suitable materials for film 8 include but are not limited to clear or translucent vinyl, acetate, PET, and polyethylene. Many common types of decal films used for signage may also be suitable for film 8.

Light extracting features 20 may include any suitable means for receiving and redistributing light and should generally be configured to extract light from pane 4. Features 20 may be configured to extract light by means of scattering, reflection, refraction, deflection, diffraction and may be further configured to do so with changing one or more properties of light. Exemplary properties of light that may be changed by film 8 and/or features 20 include but are not limited to wavelength, polarization, apparent brightness, spectral distribution, angular and/or spatial distribution, dispersion, etc. According to one embodiment, film 8 is optically clear and configured to generally preserve the spectral properties of light propagating in pane 4. According to one embodiment, film 8 may have specific color-filtering properties thus being able to change the color of light that passes through the film.

By way of a more specific illustrative example of light-extracting film 8, features 20 may include light-diffusing surface microstructures formed in the surface of the film. The microstructures may include ordered or random surface relief features formed, for example, by means of etching, embossing, laser ablation, sanding, micromachining, micro-replication and any other method suitable for producing the desired surface texture or relief. In a further non-limiting example, features 20 may be formed by depositing a layer of light scattering material, such as ink or paint onto the surface of film 8 or directly onto the surface of pane 4.

In one embodiment, light extracting features 20 may have phosphorescent or fluorescent properties. For example, features 20 may include one or more shapes cut from a sheet of fluorescent material that converts shorter wavelengths of light in the UV or visible spectrum into longer wavelengths in the visible range. Such sheet-form shapes may be laminated onto the surface of pane 4 and configured to scatter light with fluorescent effect when illuminated with a light source. By way of example and not limitation, the fluorescent material may be configured to convert 350 nm-400 nm UV light from a "black light" into visible wavelengths.

In one embodiment, light extracting features may include an image print which is made on a sheet of paper or printable polymeric material. Such print should preferably be made using inks or paints that become particularly conspicuous when illuminated by a light source.

Film 8 and particularly features 20 may be located at any suitable area of pane 4 surface. In at least some embodiments, it may be preferred that features 20 are disposed in a generally different location of the surface of pane 4 than optical element 6 and light source 30. In one embodiment, features 20 may be located in a mid-portion of pane 4 while light source 30 and/or optical element 6 are located at an edge and masked from viewing. In such an arrangement, a distinct visual appearance of glowing features 20 in the middle of the highly transparent glass window pane may be realized with a minimum glare from light source 30, thus providing a more conspicuous optical effect.

The mutual disposition of light coupling optical element 6 and light extracting features 20 should be such that at least a portion of light emitted by source and injected into pane 4 can be intercepted by the light extracting features. In one embodiment, It is also preferred that optical element 6 is designed to inject light into pane 4 while directing such light generally towards the location of features 20. More particularly, in order to maximize light extraction, it may be preferred that direction 98 generally points towards the center of an area formed by light extracting features 20.

In operation, light emitting diodes 32 of source 30 emit light towards light coupling optical element 6 which, in turn, injects said light into pane 4 generally at an acute injection angle with respect to the plane of pane 4 and also directs such light towards light extracting features 20. The injection angle should be sufficiently low to result the subsequent light propagation between the opposing faces of pane 4 in a waveguide mode. In other words, the incidence angle of light rays onto the opposing faces of pane 4 resulting from the light injection should generally be greater than the TIR angle at each of the faces.

It will be appreciated that, when the TIR conditions are met at least for one of the two faces of pane 4, they will generally be met for the opposing parallel face as well. Accordingly, light injected into pane 4 may propagate considerable distances along its broad-area surfaces which may involve a number of light bounces from the opposing faces by means of TIR. The effective distance of light propagation along the pane is primarily defined by the degree of optical transmissivity of the pane' material and by the surface smoothness. It will be appreciated that many common objects such as glass panes of windows and door, acrylic sheets and polycarbonate sheets are generally capable to guide light to distances from at least several centimeters with negligible attenuation up to several meters with some more appreciable attenuation.

At least some types of commercially available water-clear architectural glass used for storefronts have reduced iron content and often have exceptional light transmission properties. Framed window panes made from such types of glass may be particularly suitable for face-lit waveguide illumination systems disclosed in this invention. As light propagates between the opposing broad-area surfaces of pane 4 towards features 20 in response to transmission and TIR, at least a portion of the propagating light will reach features 20. Each of features 20 scatters the incident light so that at least a substantial portion of the scattered light is extracted from pane 4 towards the viewer. As a result, features 20 will appear brighter than the surrounding background surfaces of film 8 and pane 4.

It will be appreciated that the apparent brightness and color of features 20 may be controlled by the brightness and color of source 30 thus providing a convenient means of making visually appealing and conspicuous illuminated signs. It will be appreciated that an embodiment illustrated in FIG. 1 may be conveniently used for making various signage using existing building elements, such as windows or door glass panels, and without undue structural intrusion. Also, it is noted that this invention may be applied to a variety of panel lighting and signage applications where edge-lit LGPs have been traditionally employed. Since the light injection components of system 2 can be attached to either front or back surface of the LGP, no access to the panel's edge is necessary, which may enhance the utility of the device, especially in the applications where the access to the edges is difficult or unwanted.

The light injecting and light extracting components of system 2 may be made removable thus making the device practical for temporary, low-cost signage. For example, film 8 that includes suitable light extracting features can be laminated onto the respective face of pane 4 using a low-tack adhesive or using static cling. When no longer needed, such film 8 may be peeled off and discarded or stored for future use. Similarly, light coupling optical element 6 may be attached to a face of pane 4 using a low-tack adhesive or pressed against the pane surface to eliminate the air gap. An index matched, optically transmissive filler or encapsulant may be used to assist in gapless optical coupling of element 6 to pane 4. Suitable encapsulant materials may include silicones, ethylene vinyl acetate (EVA) or any other soft and clear medium. Alternatively, optical element may be permanently bonded to an optically clear film which, in turn, may be laminated onto the respective face of pane 4 using static cling or low-tack adhesive for easy removability.

Figure 2:
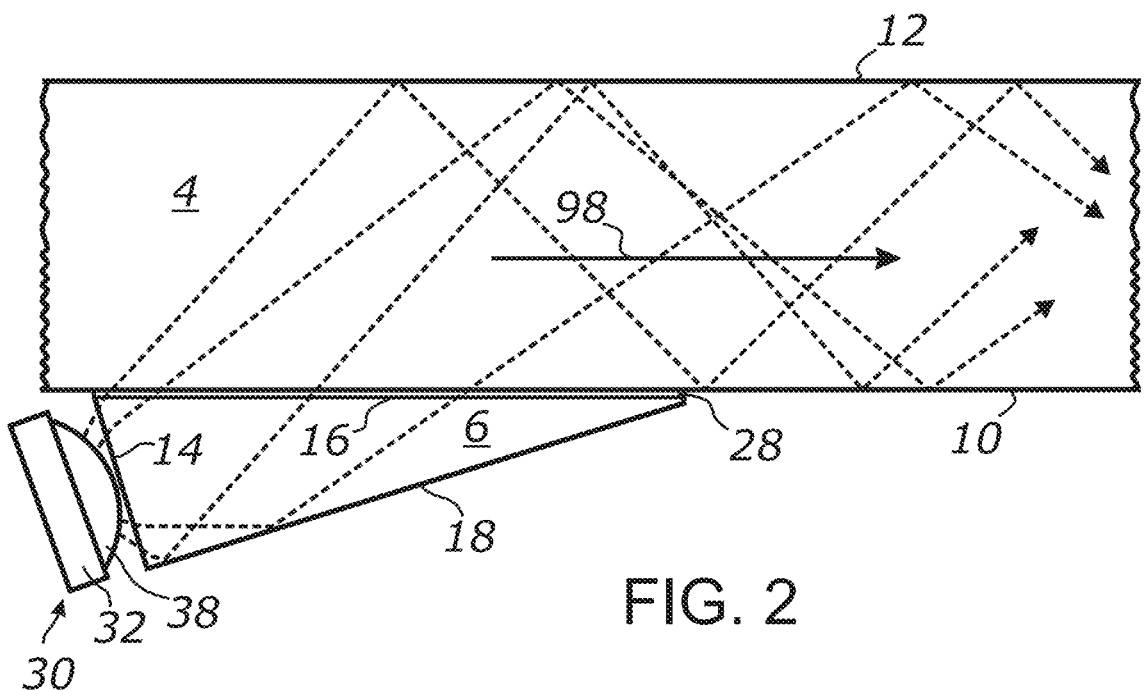
FIG. 2 is a schematic cross-sectional view and raytracing of a face-lit waveguide illumination system portion, showing a wedge-shaped light coupling optical element, according to at least one embodiment of the present invention.

FIG. 2 depicts, in a cross-section, a portion of optically transmissive window pane 4 and an exemplary configuration of the linear prism forming element 6. Window pane 4 has parallel broad-area surfaces 10 and 12 opposing each other and representing the opposing faces of the pane. The linear prism is formed by a wedge-shaped block of a transparent material which has a sharply asymmetric configuration in a transversal cross-section with the taper of the respective wedge generally pointing towards direction 98. Particularly, the prism has the transversal cross-section of a scalene right-angle triangle which hypotenuse is facing surface 10 of pane 4. In the context of this invention, the term "transversal cross-section" of an elongated or linear body is directed to mean a cross-section in a plane which is perpendicular to the prevailing longitudinal axis of said body.

By way of example and not limitation, such linear prism may be made by extrusion or injection molding from bulk acrylic (PMMA) or polycarbonate material. In a further non-limiting example, the prism may be made by machining of a rectangular block, plate or slab of acrylic, polycarbonate or glass with the subsequent surface polishing to a high gloss.

The linear prism which forms optical element 6 has a light input face 14 represented by a shorter cathetus of the respective right-angle triangle, a smooth and planar coupling face 16 represented by the triangle's hypotenuse, and a reflective face 18 represented by the longer cathetus. Faces 14 and 16 and faces 16 and 18 make acute dihedral angles with respect to each other pairwise. Face 16 is attached to surface 10 with a good physical and optical contact so that element 6 becomes optically coupled to pane 4. A layer 28 of index matching clear adhesive is provided to promote the adhesion and optical contact. The refractive index of layer 28 is preferably selected to be greater or approximately match that of element 6 and should ensure that light can freely pass from element 6 to pane 4 in a broad range of incidence angles, without the risk of TIR at the respective optical interface.

LED-based light source 30 is provided in the immediate vicinity of face 14 of element 6. Each of light emitting diodes 32 of light source 30 may have an integrated collimating lens 38 of a refractive type. Lens 38 may have a spherical aperture and may be designed to improve light extraction from LED 32 and/or narrow the angular distribution of light emitted by the respective LED chip. The light output surface of source 30 is disposed adjacent to face 14 so that the emitted light can freely enter into element 6 without substantial light spillage. It will be appreciated that, when face 14 is planar and is exposed to a non-parallel beam of incident light, said light will undergo refraction so that the angular distribution of the beam will be generally narrower within element 6 than in the air.

The slope of face 14 with respect to the surface of pane 4 is selected so that at least a substantial portion of light entering element 6 makes sufficiently high angles with respect to a normal to the surface of pane 4. Particularly, the resulting angles of light propagation should allow for TIR at least from the portions of surfaces 10 and 12 exposed to the low-n outside medium, such as air. Accordingly, light entering pane 4 at such sufficiently high incidence angles will be reflected at least once from surface 12 by means of TIR.

It will be appreciated that, once the condition for TIR at surface 12 is met, it will also be automatically met for the opposing surface 12 due to the parallelism of surfaces 10 and 12. Therefore, any ray propagating at sufficiently high incidence angle with respect to a surface will become trapped in pane 4 and can propagate in a waveguide mode by bouncing from surfaces 10 and 12.

Optical element 6 should preferably be designed to prevent or at least minimize secondary interactions of light rays with face 16 and thus prevent or minimize light decoupling from pane 4 through element 6. Particularly, rays injected into pane 4 at near-TIR angles should generally strike only a free portion of surface 10 in order to prevent re-entering into element 6 and escaping from the waveguide mode.

For this purpose, the transversal width of coupling face 16 (represented by the hypotenuse of the respective right-angle triangle in FIG. 2) may be selected to not exceed a certain maximum width $w_{max}$. The maximum width $w_{max}$ may be defined from various considerations which may account, for example, for the angular distribution of the beam emitted by source 30, the transversal size of source 30, the refractive indices of element 16 and pane 4, as well as the thickness of pane 4.

In one embodiment, the maximum width $w_{max}$ may be defined from the following relationship:

$$w_{max} = \frac{d}{2\tan(\phi_{TIR})}, \quad \text{(Equation 2)}$$

where d is the thickness of pane 4 and $\phi_{TIR}$ is the critical TIR angle characterizing surfaces 10 and 12 of the pane. Considering that the medium surrounding pane 4 can commonly be air ($n_R \approx 1$) and that Equation 1 then translates into $\sin(\phi_{TIR}) = 1/n_f$, obtain after simplification:

$$w_{max} = \frac{2d}{\sqrt{n_f^2 - 1}}. \quad \text{(Equation 3)}$$

In an exemplary of a glass window pane 4, $n_f \approx 1.51$ and $\phi_{TIR} \approx 41.5°$, which gives $w_{max} \approx 1.8d$. To put it differently, the ratio between the transversal width of the contact area of linear optical element 6 with the face of a glass window pane and the thickness of such pane should generally not exceed 1.8. At this ratio, the acceptance angle of the optical pair formed by glass pane 4 and linear optical element 6 may be maximized since any ray which enters into pane 4 at greater-than-TIR incidence angle will be captured into the waveguide mode. In more general terms, the width of the elongated body of optical element 6 should normally be less than twice the thickness of pane 4 it is attached to.

In a further, more specific example of a 6-mm window pane, the transversal width of face 16 should generally not exceed 10-11 mm. At the same time, it is noted that the transversal width of input surface 14 (represented by the length of the shorter cathetus of the respective triangle in FIG. 2) should be made sufficient to accommodate the light emitting aperture of light source 30.

It will be appreciated from the above examples that a thicker window pane 4 will generally accommodate a wider contact surface of linear light-injecting optical element 6 and a larger-aperture source 30. However, it should be understood that other factors may also influence the size selection for element 16 and/or light source 30. Particularly, when the light beam from source 30 can be collimated to a narrow angular spread, the angular distribution of light in the waveguiding plate of pane 4 may also be made sufficiently narrow. A sufficiently narrow beam, in turn, may be coupled into pane 4 at lower out-of-plane angles thus extending the distance between the individual bounces of a light ray from surface 10 and generally allowing for the use of a wider optical element 6.

Referring further to FIG. 2, surface 18 is configured to intercept rays propagating away from surface 16 and redirect them into pane 4. The angular disposition of face 18 with respect to faces 14 and 16 is so selected that that at least a substantial portion of light striking surface 18 is reflected by means of TIR with minimum or no light exiting into the surrounding medium. Additionally, the angle of face 18 should be selected so that the reflected rays obtain sufficiently high angles with respect to a normal to surfaces 10 and 12, generally above the respective TIR angle, and thus can also be coupled into the waveguide mode.

It will be appreciated that light coupled to pane 4 according to the above principles will propagate along the opposing pane faces away from light source 30 and along direction 98 by bouncing from opposing smooth broad surfaces 10 and 12. At least a portion of such light may eventually reach light extracting features 20 (not shown in FIG. 2) located at a distance from source 30 along direction 98. Light extracting features 20 may thus extract (decouple) light from the pane thus providing the desired illumination function.

Figure 3:
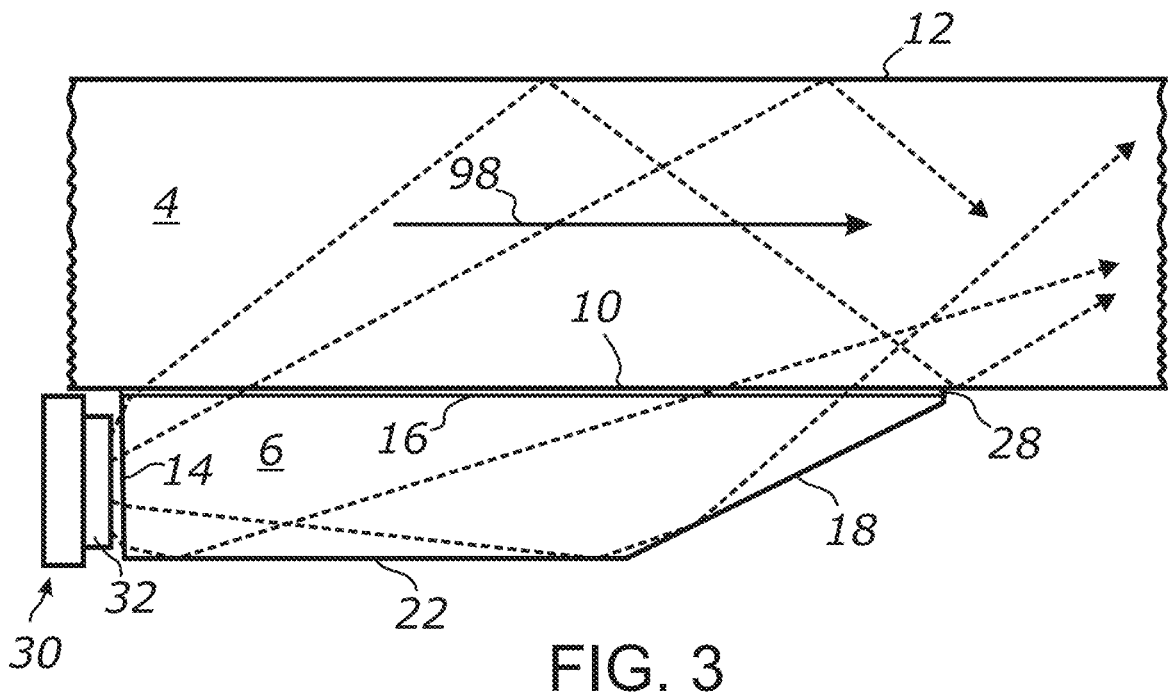
FIG. 3 is a schematic cross-sectional view and raytracing of a face-lit waveguide illumination system portion, showing a tapered light coupling optical element, according to at least one embodiment of the present invention.

FIG. 3 illustrates an alternative configuration of optical element 6 which comprises planar faces 14, 16, 18 and further comprises a face 22 which extends generally parallel to face 16 and defines a planar portion of the optical element. The planar portion of element 6 is terminated with a wedge portion defined by face 18. Face 14 of FIG. 3 is disposed perpendicular to surface 10 and is configured to accept light in a broad range of incidence angles. Light source 30 comprising a linear array of light emitting diodes 32 is positioned adjacent to face 14. The optical axis of each light emitting diode 32 is aligned parallel to the plane of pane 4. Layer 28 of index-matched optical adhesive of any other type of coupling agent is provided along the extent of surface 16 so that there is a good optical contact between element 6 and pane 4.

In operation, referring to FIG. 3, light emitting diode 32 illuminates face 14 by a divergent beam of light. Face 14 intercepts at least a substantial portion of the emitted light and admits said light into optical element 6 with at least some refraction which somewhat narrows the angular beam spread. About half of light entering element 6 is communicated to pane 4 directly through the optical interface defined by face 16. The rest of light enters pane 4 after first reflecting from face 22 and/or face 18. It will be appreciated that face 22 extending parallel to surface 10 does not change the propagation angle with respect to a normal to surface 10. Therefore, rays initially propagating in element 6 at greater then TIR incidence angles will maintain such angles after bouncing from face 22. The slope of face 18 with respect to surface 10 may be selected so that most rays striking said surface are redirected into pane 4 at angles which permit for TIR propagation and so that light escape is minimized.

Thus, the configuration of optical coupling depicted in FIG. 3 also allows for injecting at least a substantial portion of light emitted by source 30 into pane 4 through its planar face. Notably, light becomes trapped within pane 4 by means of TIR so that it can be transported along direction 98 and further extracted by light extracting features 20 (not shown in FIG. 3) at a different location of the pane.

It will be appreciated that, besides providing light distribution and transport to features 2, pane 4 may provide convenient means for mixing and homogenizing light emitted by the LED array. Each of the light emitting diodes 32 may be configured to emit light in the same color in which case features 20 can be uniformly illuminated by that color.

The LED array may be controlled in a number of ways. In one embodiment, the LED array may be powered on and off by applying the same constant or variable current to each LED. Alternatively, different LEDs 32 in the array may be configured to emit different colors and each of such different-color LEDs 32 may be controlled individually. Since light beams from individual LEDs 32 mix in pane 4, this can create various color and brightness effects as light is scattered by the medium of pane 4 or extracted by light extracting features 20. LEDs 32 may also be arranged in clusters of different-color emitters, such as red-green-blue (RGB) or the like, and the color of the emission may be controlled by changing the intensity of individual LEDs in each cluster.

Figure 4:
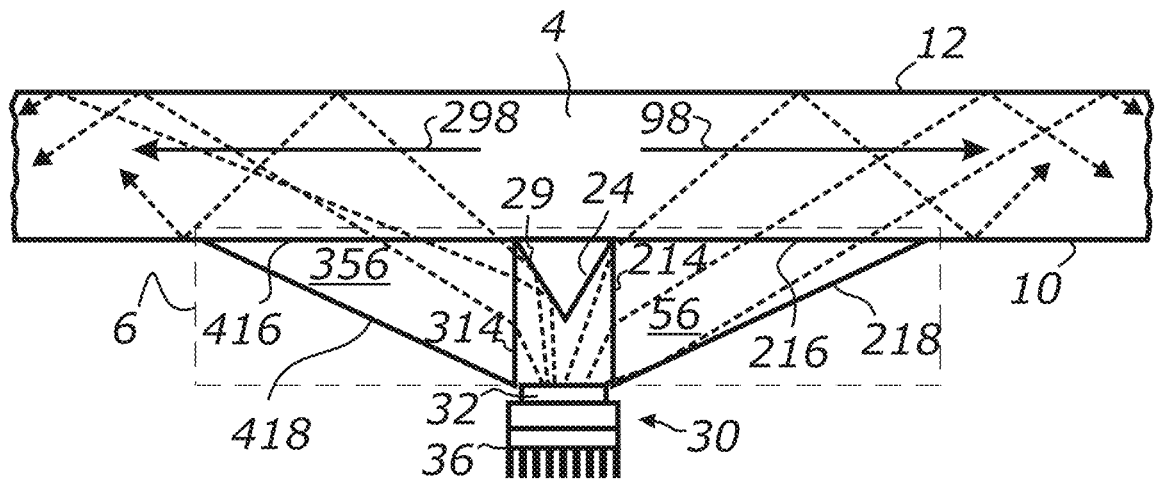
FIG. 4 is a schematic cross-sectional view and raytracing of a face-lit waveguide illumination system portion, showing a symmetrical configuration of a light coupling optical element, according to at least one embodiment of the present invention.

FIG. 4 depicts a further alternative configuration of light coupling components of system 2. Referring to FIG. 4, there is provided an optically transmissive planar light guide represented by a portion of window pane 4 having opposing broad-area surfaces 10 and 12 extending generally parallel to each other. System 2 further comprises optical element 6 including two identical linear prisms 56 and 356 disposed in a symmetrical configuration. Prisms 56 and 356 have substantially planar faces 216 and 416, respectively, which are made attachable to surface 10 of window pane 4 with a good optical contact. An optical adhesive or encapsulant may be used to promote such optical contact.

A face 214 of prism 56 and a face 314 of prism 356 both are perpendicular to the plane of pane 4. A face 218 of prism 56 and a face 418 of prism 356 are both sloped with respect to surface 10 so that they can redirect light into pane 4 by means of TIR. A central reflective element is provided between prisms 56 and 356. The reflective element is formed by symmetrically disposed, sloped reflectors 24 and 29 which are mirrored for good specular reflectivity.

Light source 30 represented by one or more light emitting diodes 32 is disposed immediately adjacent to the opening between prisms 56 and 356. An optional heat sink 36 is provided on the back of each light emitting diode 32 to promote natural cooling. Prisms 56 and 356 as well as reflectors 24 and 29 are configured work cooperatively to inject at least a substantial portion of light emitted by LEDs 32 into pane 4 at angles allowing for TIR from surfaces 10 and 12 and towards the respective directions. Accordingly, prism 56 and reflector 24 should be configured to direct light towards direction 98 and prism 356 and reflector 29 should be configured to direct light towards an opposing direction 298.

At the same time, the respective prisms and reflectors should be configured to minimize or prevent light re-entry onto light coupling optical element 6. Accordingly, light emitted by source 230 and injected into pane 4 by element 56 will propagate in pane 4 by means of TIR symmetrically away from the source. Light extracting features 20 (not shown) may be distributed along directions 98 and 298 at any predetermined locations of pane 4. Such light emitting areas should be configured to extract the injected light towards a viewer or any predetermined direction.

The transversal width of the area of optical contact of such symmetrical optical element 6 with pane 4 may be defined based on reasoning similar to that used for obtaining Equation 3 above for an asymmetrical linear optical element 6. Accordingly, in one embodiment, the maximum transversal aperture $A_{max}$ of the symmetrical element 6 may be selected based on the following relationship:

$$A_{max} = \frac{4d}{\sqrt{n_f^2 - 1}}.$$ (Equation 4)

Thus, in an exemplary case of a glass window pane 4 ($n_f \approx 1.51$), the width of the symmetrical light coupling element 6 may be up to a factor of 3.5 greater than the thickness of the glass pane when the acceptance angle is to be maximized.

Referring to FIG. 4, it is noted that the illustrated cross-section may also represent various non-linear configurations of optical element 6 and may be applied to the case when optical element 6 has an axisymmetrical configuration which can be obtained by rotating the cross-section of FIG. 4 around an axis.

The faces of prisms 56 and 356 and the walls of reflectors 24 and 29 are not limited to having a linear profile in a cross-section and may have various concave or convex profiles. Particularly, reflectors 24 and 29 may form a cuspated shape which may be well suited for enhancing the efficiency of light coupling into pane 4 or providing a specific light distribution pattern. Likewise, face 18 of FIG. 2 and FIG. 3 as well as faces 218 and 418 of FIG. 4 are not limited to having a linear generatrix in a cross-section and may be also be formed by any curved or segmented profile. The suitable profiles may be selected, for example, in response to the known angular distribution of light emitted by source 30 or to the transversal size of light emitting diode 32 or its collimating optics, if any. Alternatively or in addition to that, the surface profiles may be selected based on the thickness of pane 4 and configured for reducing the light spillage into the environment. Any of faces 18, 218 or 418 may also be optionally mirrored to prevent light escape at lower-than-TIR incidence angles.

Figure 5:
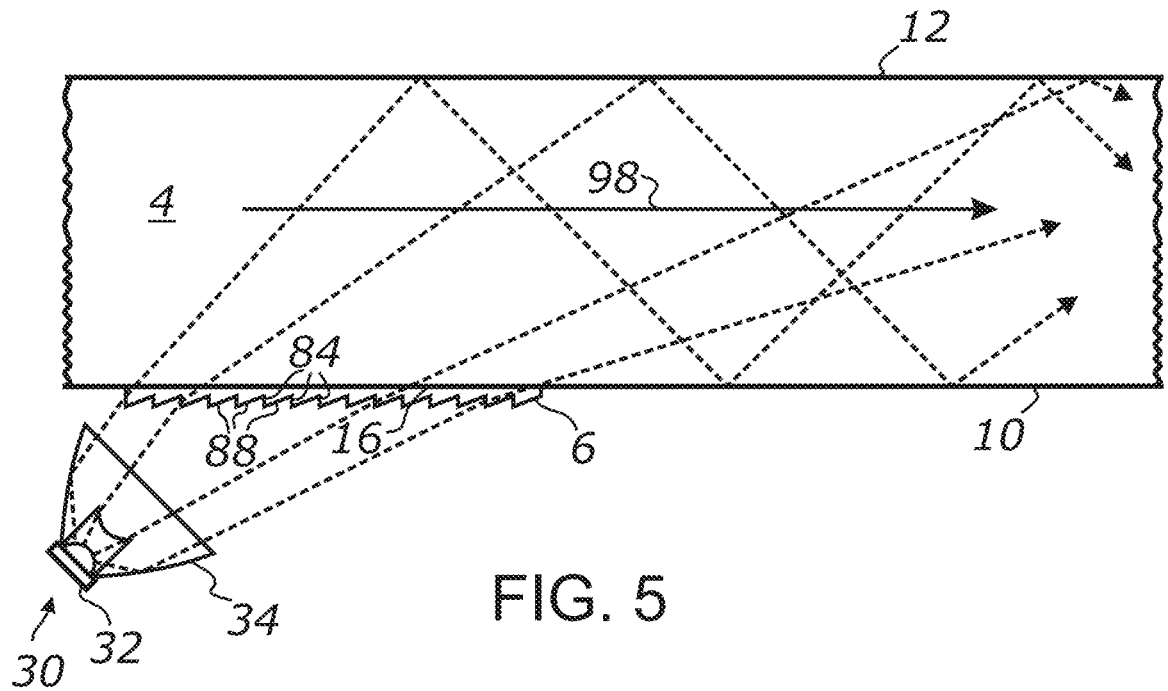
FIG. 5 is a schematic cross-sectional view and raytracing of a face-lit waveguide illumination system portion, showing a prismatic film laminated onto a face of a window pane, according to at least one embodiment of the present invention.

FIG. 5 illustrates an embodiment of system 2 in which linear optical element 6 is represented by a band or strip of optically transmissive prismatic film laminated onto surface 10 of window pane 4. The prismatic film has a smooth surface facing surface 10 and a linear pattern of parallel microprisms facing outwardly from pane 4. The microprismatic pattern may be formed in the surface of the film by any suitable method, such as, for example, embossing, microreplication, and the like. Each linear microprism may have two planar faces 84 and 88 so that the prism array is formed by a continuous sequence of alternating faces 84 and 88.

Linear light source 30 comprising an array of LEDs 32 is tilted with respect to a normal to surface 10 in the illustrated cross-section so as to provide a skew incidence of the light beam into the light receiving face of window pane 4 and facilitate light injection at angles favorable for TIR propagation. Light source 30 is also provided with a cylindrical collimating lens 34 extending along the linear LED array. The transversal cross-sectional outline of lens 34 may be selected to provide a narrow-angle collimation for the divergent beam emitted by LEDs 32. According to one embodiment, lens 34 may be selected from cylindrical lenses providing the Full Width Half Maximum (FWHM) angle of 30 degrees or less. According to one embodiment, FWHM may be less than 20 degrees and, more preferably, less than 10 degrees.

By way of example and not limitation, a continuous strip TIR optic with part numbers 10397 or 10398 commercially available from Carclo Optics may be employed for lens 34. Such or similar continuous strip optic may be injection molded or extruded from PMMA (acrylics), polycarbonate, or any other suitable optically-clear plastic material.

According to an aspect of the present invention, referring to FIG. 5, the angles of each of the faces 84 and 88 with respect to the plane of surface 10 may be selected in a manner similar to selecting the angles of faces 14 and 18 of FIG. 2. More particularly, each face 84 should be configured to direct light into the medium of window pane 4 at such an incidence angle with respect to a normal to surfaces 10 and 12 which is greater than the TIR angle at said surfaces. Depending on the initial propagation angle of a light ray, such function may involve some refraction and bending the ray path accordingly.

It will be appreciated that, when the prismatic film forming linear optical element 6 is index matched to the refractive medium of pane 4, light rays refracted by faces 84 will generally maintain about the same propagation angles upon entering the pane. On the other hand, some rays may be emitted by source 30 at sufficiently low out-of-plane angles which already make incidence angles with respect to a normal to surface 10 greater than the TIR angle. Therefore, such rays may be injected into pane 4 without appreciable bending in which case the light coupling function of optical element 6 may be limited to suppressing refraction at surface 10 and thus preserving the TIR incidence angles for the rays being injected into pane 4.

Accordingly, in at least some embodiments, faces 84 do not have to be necessarily configured to refract the incident light and may be positioned about perpendicularly to the incident beam to simply admit light into the film material without appreciable refraction. By approximate matching the refractive index of the prismatic film material to that of pane 4 and by providing a good optical contact of the film with surface 10, the refraction at surface 10 can be suppressed. In this case, light rays entering the prismatic about perpendicularly to faces 84 will be injected into pane 4 without change in propagation direction. Thus, when the initial angle of the incidence rays with respect to a normal to surface 10 is greater than the TIR angle characterizing said surface and the ray maintains its direction upon entering the medium of pane 4, the condition of TIR at both parallel surfaces 10 and 12 will automatically be met and the injected light can further propagate in pane 4 in a waveguide mode.

Referring further to FIG. 5, the slope of each face 88 may be selected to minimize the chance of light injection at incidence angles lower than TIR with respect to a normal to surfaces 10 and 12. In at least some configurations of the prismatic film, this may be achieved by minimizing the interaction of the face with the incident light beam emanated by source 30. By way of example and not limitation, the apparent light receiving aperture of faces 88, as viewed from source 30, may be minimized by varying the slope of faces 88 with the distance from source and making each face 88 about parallel to the line of sight to source 30. In one embodiment the slope of faces 8 with respect to surface 10 decreases with the distance from light source 30. In one embodiment, the slope angle of farthermost faces 88, with respect to surface 10, may be less than 10 degrees or so. Furthermore, it may be preferred that at least the farthermost faces 88 have even lower slope angles with respect to surface 10. This may have an added advantage of faces 88 acting as TIR reflectors in secondary interactions with light rays which have been injected into pane 4 by the preceding portions of the prismatic film along the propagation path. It will be appreciated that each face 88 extending near parallel to surface 10 may still reflect a substantial part of light rays already propagating in pane 4 in a waveguide mode as opposed to the case where face 88 would have a relatively high slope angle with respect to surface 10.

Figure 6:
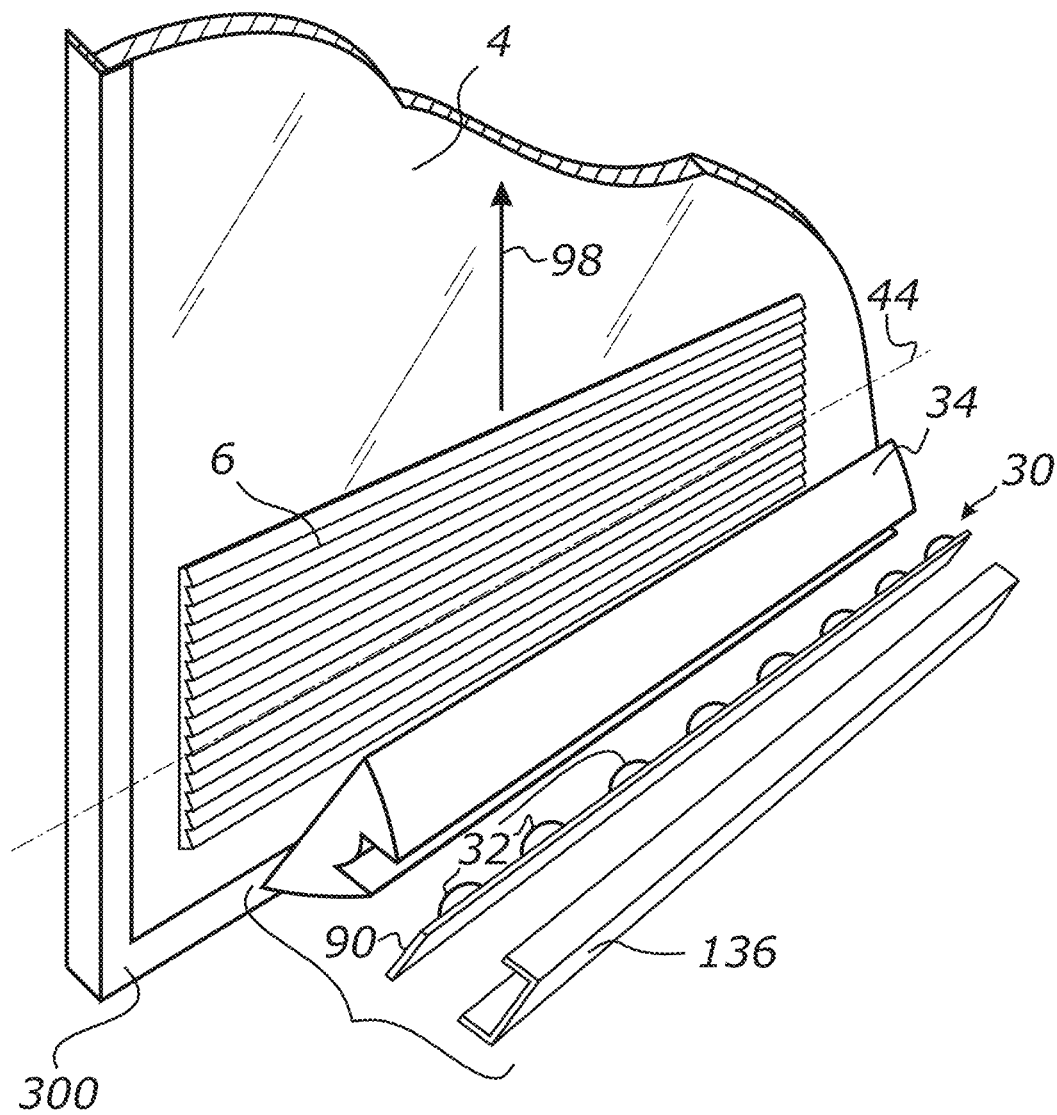
FIG. 6 is a schematic view of a face-lit waveguide illumination system portion, showing an exemplary arrangement of linear light emitting and light coupling elements, according to at least one embodiment of the present invention.

FIG. 6 illustrates an exemplary arrangement of linear light emitting and light injecting components of system 2 in an exploded perspective view. Window pane 4 of FIG. 6 exemplifies a framed glass window pane in a building facade or a glass pane of a storefront window.

Light-injecting optical element 6 is formed by a microstructured prismatic film similar to that of FIG. 5. The prismatic film is laminated to a face window pane 4 in a bottom portion of the window. The orientation of the prismatic film is such that its longitudinal axis 44 is aligned parallel to the bottom edge of the window and the linear micro-prisms of the film also extend generally parallel to the bottom edge. The face-mounted prismatic film is firmly attached to the glass surface using a low-tack optically-clear adhesive so that there is provided a good optical contact between the film and pane 4.

Light source 30 of FIG. 6 is formed by a strip of high-brightness LEDs 32 interconnected with each other in a linear LED array and mounted to a narrow heat-conducting printed circuit board (PCB) 90. A metal channel 136 is attached to the back of PCB 90 with a good thermal contact. Channel 136 may have a dual function. For example, it may provide a structurally rigid encasement for the LED array and also act as a heat sink for the LEDs 32.

Light source 30 is also associated with linear collimating lens 34 extending parallel to the longitudinal axis of the LED array. Lens 34 should also be properly positioned with respect to the LED strip so that it can intercept all or at least a substantial part of the divergent light beams emanated by individual LEDs and collimate said beams at least in a plane perpendicular to the longitudinal axis of the LED array.

Collimating lens 34, light source 30 and channel 136 may be bundled together in a single linear light-emitting assembly. The light-emitting assembly may be further encased into a housing (not shown) with an opening for the emitted beam.

The light-emitting assembly of FIG. 6 is positioned slightly below the prismatic film attached to the face of pane 4, parallel to the ground. Additionally, as shown in FIG. 6, the light-emitting assembly is rotated around its longitudinal axis so that the beam emitted by source 30 and collimated by lens 34 is generally pointed from bottom up, towards the prismatic film and generally towards the opposing (top) edge of pane 4, as indicated by direction 98. The light emitting assembly or any of its components may be attached to the window's frame or directly to the face of pane 4, for example, by using suction cups or adhesive. Other methods of fixing the light emitting components of system 2 in front of optical element 6 may include attaching to the building's structural elements adjacent to the window, such as walls, floor, ceiling, etc.

Depending on the configuration of the LED strip and on the thickness of pane 4, the prismatic film may take the shape of a relatively narrow strip or tape in which the linear prismatic features extend along the longest film dimension. The width of the prismatic film may be selected, for example, based on Equation 3, and its length may approximate the length of the LED strip. However, it is noted that other parameters of systems 2 components may also be taken into account, such as the beam spread of source 30, the size of individual LEDs 32, the transversal size of the exit aperture of lens 34, and the like.

The prismatic film is configured to receive the collimated light beam emanated by the light-emitting assembly and admit such light beam into the glass medium of pane 4 at angles permitting for TIR propagation within the pane. As explained in the above-discussed embodiments referring to FIG. 5, the interaction of the collimated beam with light-injecting prismatic film may involve refraction and/or total internal reflection of rays by at least some prism facets and may further involve the suppression of refraction at surface 10.

Depending on the optical clarity of the glass of pane 4, light may propagate in a waveguide mode considerable distances along the vertical extent of the window panel. It will be appreciated that a fraction of the propagating beam may reach the vertical edges of pane 4 due to the beam divergence in the respective plane. However, it will also be appreciated by those skilled in the art that the respective light rays will generally have internal incidence angles onto the surfaces of the vertical edges greater than the TIR angle at these surfaces, as a result of beam refraction by the light-receiving facets of the prismatic film and as a result of pointing the light beam towards the top edge of the pane.

Therefore, unless the vertical edges of pane 4 are excessively rough or specially sanded, which may cause significant light scattering and decoupling from the waveguide mode, most of light rays reaching an edge of the glass pane will undergo TIR from its surface and will therefore remain in the pane. Accordingly, the vertical edges of the glass panel may participate in the waveguiding function of pane 4 and may further promote beam mixing, thus resulting a more homogeneous distribution of light within the pane. It will further be appreciated that, in the case illustrated in FIG. 6, the prevailing direction of light propagation 98 in window pane 4 will generally point from the bottom edge to the top edge of the pane even when the beam divergence and reflections from vertical edges of the pane are considered.

Provided that pane 4 has a sufficient optical clarity and low light absorption at least in the desired wavelengths, light extracting features 20 (not shown in FIG. 6) may be positioned along direction 98 at a considerable distance from the area where light is injected into the pane. Since mixing divergent light beams from a series of LEDs 32 in pane 4 effectively distributes light through the volume of pane's body and since multiple reflections from opposing surfaces 10 and 12 homogenize such light, a uniform illumination of light extracting features 20 may be achieved even when such features are distributed over a relatively large area of the pane. Accordingly, decoupling light from pane 4 using evenly-lit light extracting features 20 may produce a relatively uniform glow from the respective portions of the pane. Considering that light extracting features 20 will deplete light from pane 4 along direction 98, such features may be configured to have a variable extraction rate depending on the distance from source 30. For instance, when light scattering elements are used for light extraction in features 20, the density of such scattering elements may be made increasing along direction 98.

Referring to both to FIG. 5 and FIG. 6, it is noted that this invention is not limited to employing microsprismatic films for forming extremely low-profile optical elements 6. At least in some embodiments, the prismatic film of FIG. 5 and FIG. 6 may be replaced, for example, by a holographic film having suitable light-turning and/or refraction suppressing functions and being capable of injecting at least a portion of light entering its surface into pane 4 at angles favorable for TIR. In further examples and embodiments, optical element 6 may also include diffracting films, light scattering films or any other kind of light-turning films which can be configured for light injection into a waveguide mode.

In one embodiment, optical element 6 may include a light transmitting film or a thin plate structure which has two or more layers and is configured to redirect light internally by embedded microstructure rather than externally by surface microstructures such as those illustrated in FIG. 5. In a non-limiting example, the embedded microstructures may be formed by casting a liquid transparent polymer having a first refractive index over a microstructured surface of another polymer having a different second refractive index. It will be appreciated that such an overmolding or casting process will create a corrugated boundary between the different-index layers which replicates the shape of the surface microstructures of the second polymer. When the overmolded surface microstructures are represented by a parallel array of linear microprisms, the internal boundary will comprise an array of alternating facets, each facet representing a refractive or TIR-reflective optical interface that can bend light that enters such layered optical structure.

It is noted that such embedded microstructures may be formed by any suitable process that forms two or more layers of different optically-clear materials with a non-planar, preferably corrugated boundary. Such microstructures may also be made using coextrusion of two or more films having different refractive indices. Various configurations of film-thickness optical structures that suitable for optical element 6 may include the light redirecting films disclosed in co-pending U.S. patent application Ser. No. 13/662,311, incorporated herein by reference in its entirety.

Figure 7:
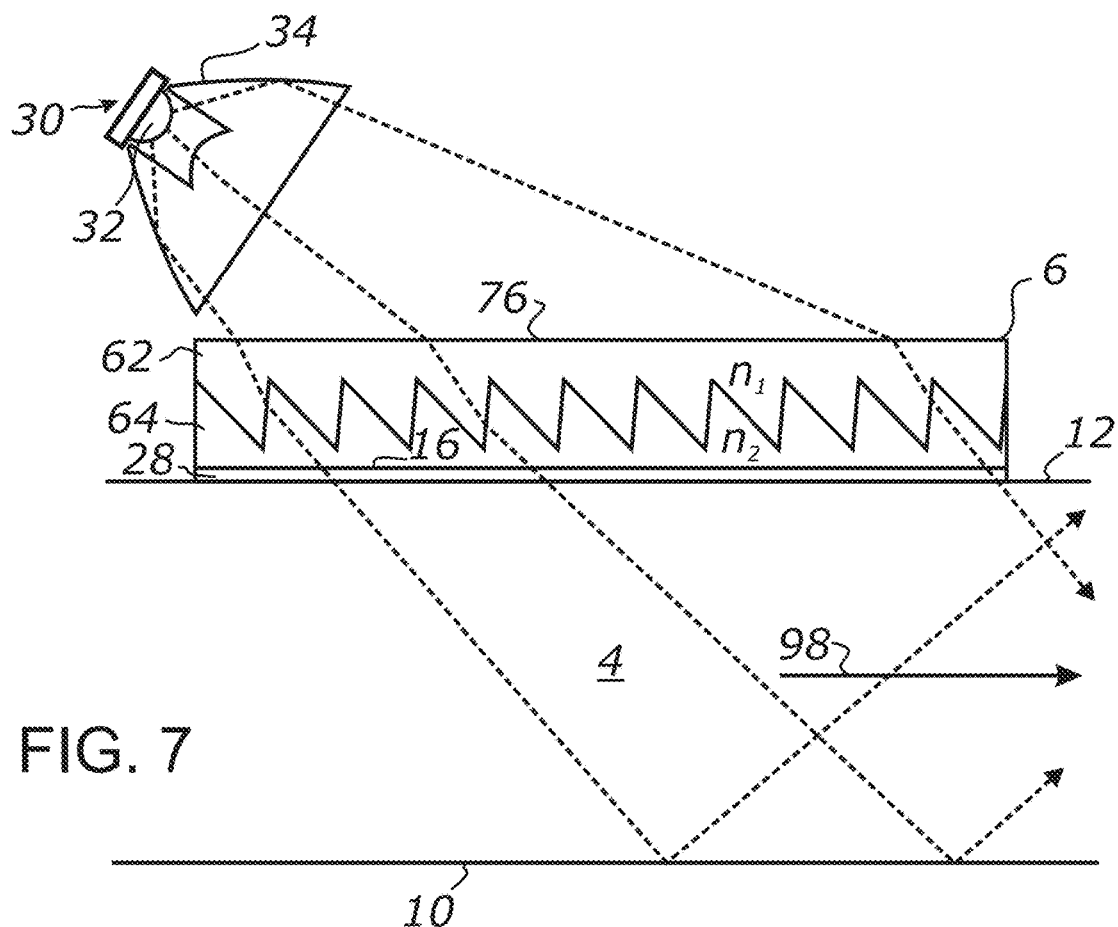
FIG. 7 is a schematic view of a face-lit waveguide illumination system portion, showing a layered light coupling element including internal corrugated boundary between two layers, according to at least one embodiment of the present invention.

FIG. 7 illustrates an embodiment of face-lit waveguide system 2 in which optical element 6 is exemplified by a two-layer optically transmissive plate having internal corrugated boundary with a prismatic (sawtooth) cross-sectional profile. It is noted, however, that the same type of corrugated boundary and essentially the same basic functionality may also be achieved using a film-thickness structure.

The plate of FIG. 7 is generally planar, has two opposing parallel surfaces 76 and 16 and is formed by a first optically transmissive layer 62 and a second optically transmissive layer 64. The plate is configured for a generally unimpeded light passage through its body where surface 76 is configured as a light input surface and surface 16 is configured a light output surface.

Surface 16 is made optically smooth and attachable to the planar surface 12 of window pane 4 with a good optical contact. Layer 28 of index matched adhesive or encapsulant is provided to promote such optical contact and adhesion.

Similarly to FIG. 6, light source 30 of FIG. 7 is exemplified by a linear array or strip of compact high-brightness LEDs 32. The longitudinal axis of the linear array extends parallel to the longitudinal axis of prismatic corrugations of the internal layer-to-layer boundary of the plate. In a further similarity to FIG. 5, source 30 also comprises collimating TIR lens 34. Lens 34 has a linear extruded configuration and is designed to collect the divergent light beam emanated by LEDs 32 and collimate such beam to a narrower angle, directing it onto light input surface 76.

As illustrated in FIG. 7, source 30 and collimating lens 34 are positioned to illuminate surface 76 at an angle. The transversal aperture of lens 34, its collimation angle and the tilt angle should be such that source 30 can illuminate substantially the entire light input surface 76 of the plate. Additionally, the direction of light emission should be generally oriented towards the intended prevailing direction 98 of light guiding in pane 4 and towards light extracting features 20 (not shown).

Referring further to FIG. 7, layer 62 of optical element 6 has a first refractive index $n_1$ and layer 62 has a second refractive index $n_2$ which is higher than $n_1$. It is preferred that there is at least a minimum relative difference in refractive indices between layers 62 and 64 to enable effective light bending. The refractive indices $n_2$ and $n_1$ as well as the angles of the prismatic facets of the boundary between the two layers should be configured to enable injecting light ray emanated by source 30 into window pane 4 at a relatively high angle with respect to a surface normal. Such angle should be greater than the TIR angle characterizing surface 10 and 12 and should provide for the subsequent light propagation in a waveguide mode by bouncing from opposing surfaces 10 and 12.

In a non-limiting example, the prismatic boundary facets which are facing source 30 may be configured to intercept at least a substantial portion of the emitted light and perform the main light bending function of element 2. As further illustrated in FIG. 7, such facets can be fairly steep, making the dihedral angles with respect to the plane of pane 4 in the range from 85 to 90 degrees. The so high dihedral angles may be advantageously selected to most effectively bend light rays within the body of element 6 towards the plane of window pane 4 so that the minimum incidence angles needed for TIR at surface 10 can be reached for at least a substantial part of the light beam.

In contrast, the boundary facets which are facing away from source 30 may be configured to make substantially lower dihedral angles with respect to such the plane of pane 4. Such dihedral angles may be further selected so that the respective facets are aligned along the prevailing path of light propagation in the body of element 6. This may be useful, for example, for minimizing or eliminating the interaction of the non-functional boundary facets with light and particularly for minimizing unwanted refractions and reflections from such facets which may result in light spillage.

It is noted that the internal boundary between layers 62 and 64 was shown in FIG. 7 with just several prismatic features for the illustrative purpose only and the illustrated representation of the boundary and the dimensions of optical element 6 should not be viewed as limiting this invention in any way. It should be understood that such boundary may also be formed by a large array of micro-scale prismatic facets which can be as small as a few micrometers across. Accordingly, the thickness of optical element 6 of FIG. 7 may also be varied in a broad range, from relatively thin and flexible films in the few-micrometer range up to rigid plates or slabs of several millimeters thick.

Figure 8:
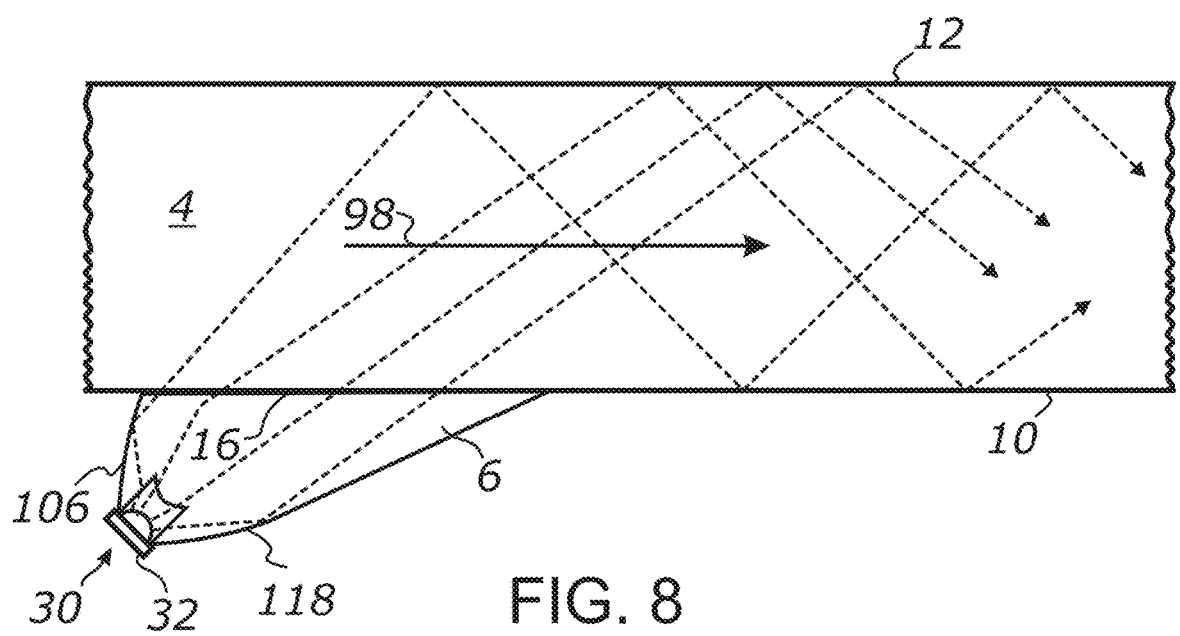
FIG. 8 is a schematic view of a face-lit waveguide illumination system portion, showing an optical element having curvilinear reflective surfaces, according to at least one embodiment of the present invention.

FIG. 8 illustrates an embodiment of face-lit waveguide system 2 in which linear collimating element 6 has curvilinear surface profiles in a transversal cross-section and where it also combines the light-injection and light-collimation functions. In the illustrated transversal cross-section, optical element 6 has a portion facing light source 30 where it is shaped as a TIR collimating lens. Such optical element 6 further features an opposing portion having planar face 16 attachable to the planar surface 10 of pane 4. The curvilinear side walls 106 and 118 of element 6 should preferably have smooth polished surfaces providing for lossless TIR and should be configured to aid the light-collimating and light-injection functions. Either one or both walls 106 and 118 may also have planar portions or can be formed by any suitable conjugate of curved and planar profiles.

The extent of planar face 16 along the prevailing propagation path of waveguide light should generally not exceed a predetermined length which is defined by the maximum out-of-plane angle of the injected beam and by the thickness of pane 4. Such length may be defined, for example by Equation 3 described above. Particularly, in an exemplary case of window pane 4 made from glass, the extent of planar face 16 along direction 98 should not exceed 1.8d, where d is the glass pane thickness.

System 2 may incorporate any masking elements to block light which may escape from optical element 6 or from adjacent portions of pane 4 due to imperfect coupling. Some light may escape may occur, for example, due to some rays striking surfaces 10 or 12 at incidence angles lower than the critical angle of TIR. When applied to panel-type illuminated signage, masking the respective areas where the stray light may emerge from the system can provide an improved appearance and contrast of the images or patterns visualized by features 20.

Figure 9:
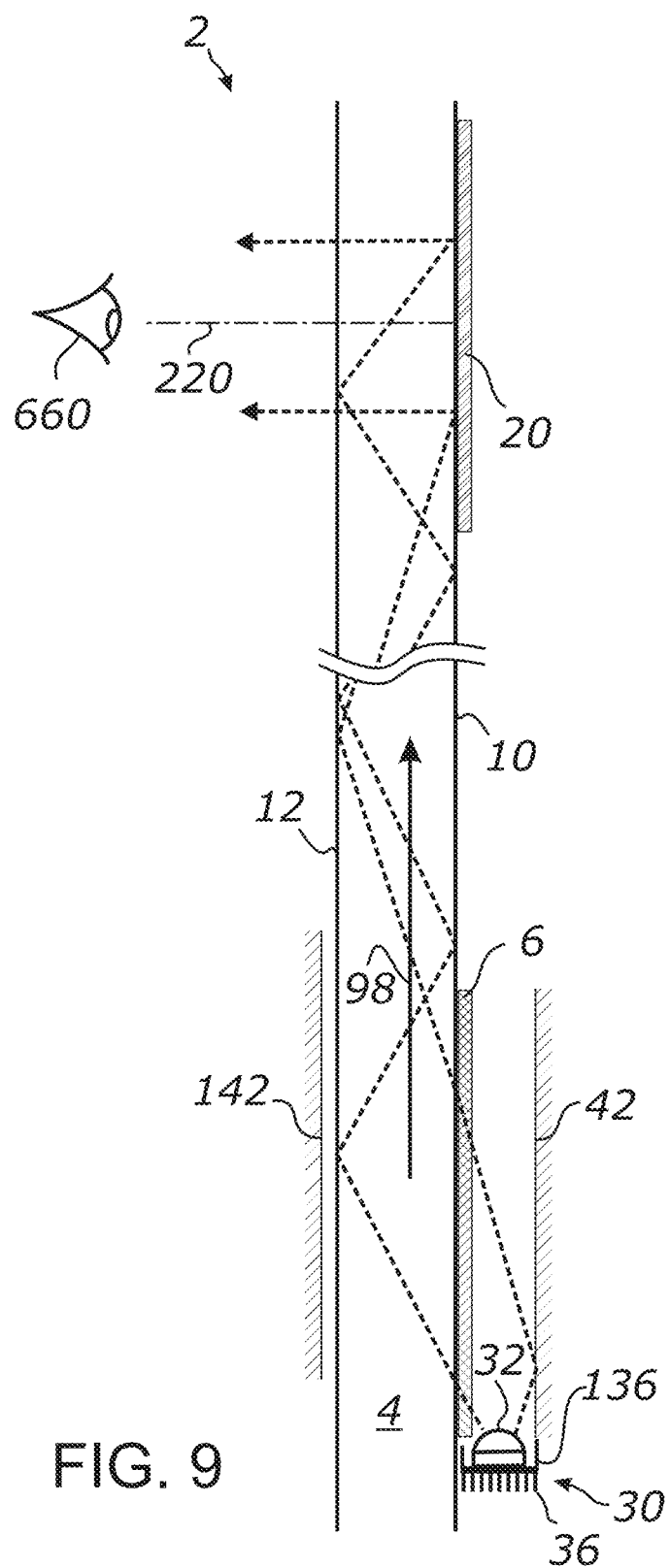
FIG. 9 is a schematic cross-sectional view and raytracing of a face-lit waveguide illumination system, showing a reflective surface extending parallel to a face of a window pane, according to at least one embodiment of the present invention.

FIG. 9 depicts an embodiment of system 2 which includes a portion of window pane 4, light source 30, light-coupling optical element 6, broad-area light extracting feature 20, a reflector 42, and light masking element 142.

Pane 4 of FIG. 9 is made from highly transparent glass material and has sufficiently smooth surfaces 10 and 12 to provide for lossless TIR propagation along at least direction 98. Such pane 4 may be exemplified by a portion of glass storefront window in which surface 10 is facing the interior of the store and opposing surface 12 is facing the outside.

Light source 30 includes a linear array of electrically interconnected LEDs 32, structural channel 136 and heat sink 36 attached to channel 136. Optical element 6 is exemplified by a strip of light transmitting film which is laminated onto surface 10 and configured to at least partially suppress the natural refraction at the air/glass interface. The light-coupling film may also be configured to bend at least rays that enter surface 10 at sub-TIR angles and communicate greater-than-TIR angles to such rays.

Reflector 42 is positioned generally parallel to the prevailing plane of pane 4 and is configured to reflect any uncoupled light rays that may emerge from pane 4 along the extent of the light coupling film. Such light may emerge from pane 4, for example, as a result of decoupling of certain light rays by element 6 due to the secondary interactions with the refraction-suppressing film. The decoupled rays may be recycled by reflecting from reflector 42 and entering pane 4 again which may further enhance light coupling efficiency. Thus, reflector 42 positioned at surface 10, which is opposite surface 12 of pane 4, may act as a light guiding channel aiding the light coupling process.

Light masking element 142 is exemplified by an opaque film or thin sheet positioned at the opposing face of pane 4. Such masking element may be useful, for example, for blocking stray light and preventing the glare that may result from some light leakage in the light coupling area. Element 142 may be configured to absorb, back-scatter or reflect light emerging from surface 12.

The broad-area light extracting feature 20 is attached to surface 10 of pane 4. It is made from an opaque or translucent back-scattering material and is configured to extract light from pane 4 and direct the extracted light out of the pane through the opposing surface 12.

In operation, window pane 4 acts as a face-lit waveguide delivery component for light which is emitted by source 30 and injected into the pane by optical element 6. Pane 4 mixes and distributes the injected light so that at least a portion of it can be intercepted and extracted by light extracting feature 20.

By using the above example of pane 4 being a storefront window with surface 10 facing inward, the extracted light can be emitted away from the store so that the glow of feature 20 may be viewed by an outside observer 660. The inside location of feature 20 may have advantages of offering protection from the outside environment or elements. Additionally, the inside location of most or all light emitting and light management elements of system 2 may also have an added advantage of providing more convenience for the store personnel, easier serviceability and better protection from theft or vandalism.

Referring further to FIG. 9, system 2 may be implemented in an alternative configuration where light extracting feature 20 is attached to the outside face or surface of pane 4 and configured to have forward-scattering properties. A yet further alternative may include configuring light extracting feature 20 to provide the visibility of its glow from both sides of pane 4.

Figure 10:
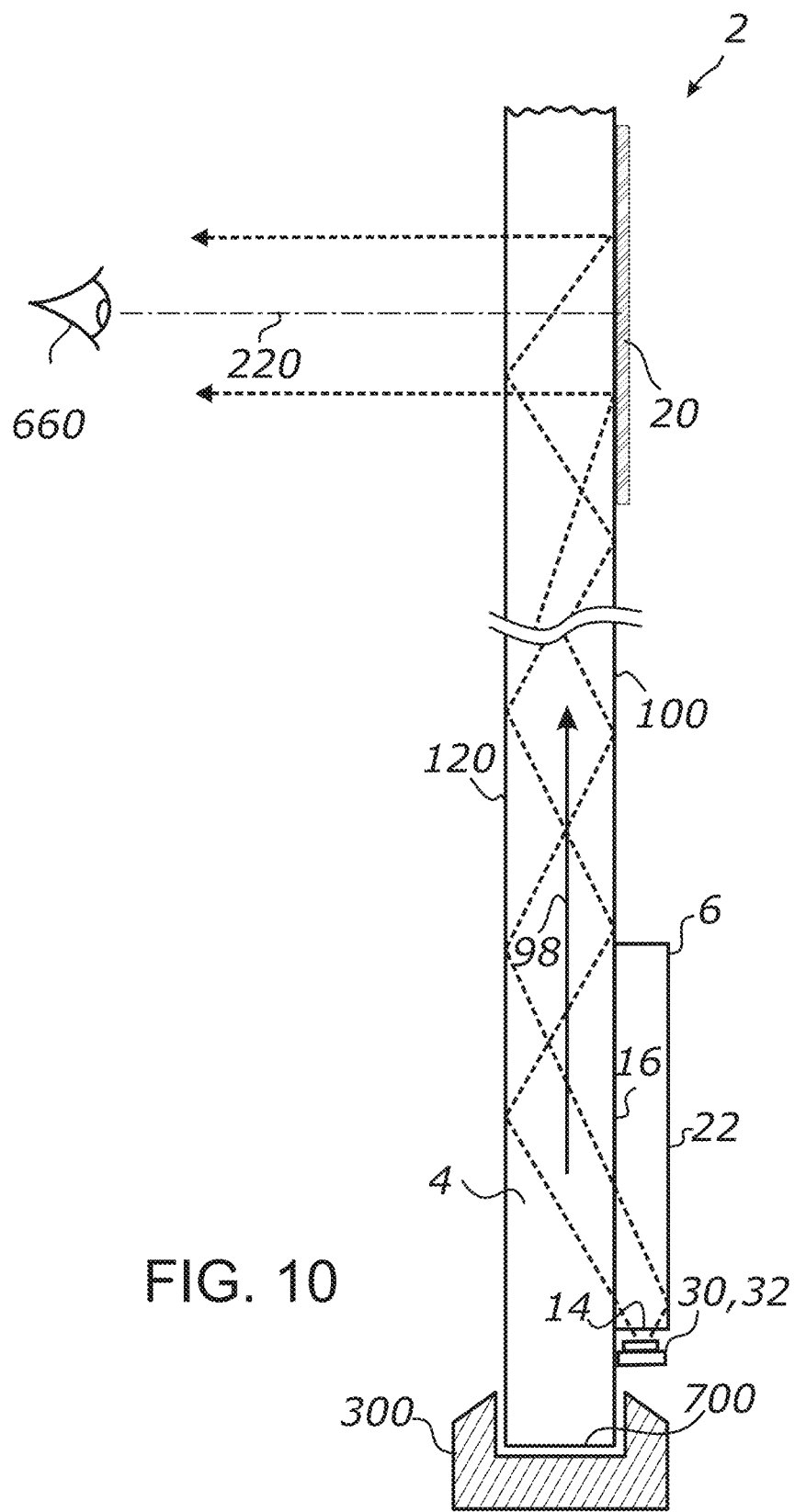
FIG. 10 is a schematic cross-sectional view and raytracing of a face-lit waveguide illumination system, showing a light source optically coupled to an edge of a planar light coupling optical element, according to at least one embodiment of the present invention.

FIG. 10 depicts an embodiment of system 2 which includes a framed portion of glass window pane 4, light source 30, light-coupling optical element 6, and broad-area light extracting feature 20. Window pane 4 has two opposing broad-area faces 100 and 120 which are generally smooth and planar. An edge 700 of window pane 4 is covered by a frame member 360 and is not easily accessible for light input. Therefore, in the illustrated case, the broad area faces of window pane 4 represents a convenient alternative light input surface for injecting light into pane 4. In the illustrated case, face 100 is chosen for light input.

Optical element 6 is formed by a rectangular planar plate or strip of light transmitting material. Direction 98 indicates the intended prevailing propagation path of light in window pane 4. Optical element 6 is attached to face 100 with a good optical contact and aligned with respect to pane 4 so that the longitudinal axis of the rectangular planar strip extends perpendicular to direction 98 and parallel to face 100.

Light source 30 included a plurality of LEDs 32 arranged in a linear array extending parallel to the longitudinal axis of optical element 6. Each LED 32 is positioned in an immediate proximity to the light input face 14 of element 6 and also in a close proximity to face 100 of pane 4. The optical axis of each LED 32 is aligned about parallel to the plane of face 100 so that the light input face 14 of element 6 is illuminated from a perpendicular direction.

Light extracting element 20 is attached to face 100 in a different location of pane 4 along direction 98. Such element 20 may include retro-scattering film which carries an image print and is configured to emit light within a prescribed angular cone towards a perpendicular direction when illuminated from the inside of pane 4. The light-scattering film of element 20 may be laminated onto face 100 with sufficient optical contact for providing light interaction with the respective light scattering features of the film.

In one embodiment, in order to maximize the efficiency of light input into pane 4 through its face 100, the thickness of element 6 and the transversal size of source 30 may be selected to be considerably less than the thickness of the pane. In one embodiment, the transversal width of the contact area of optical element 6 with face 100 may be selected from Equation 3.

In operation, referring further to FIG. 10, the light beam emitted by source 30 enters light coupling optical element 6 through face 14 and further propagates through the refractive material of element 6. It will be appreciated by those skilled in the art that, although each LED 32 may emit a highly divergent beam, the divergence angle will generally be narrower inside element 6 than in the air due to the difference in refractive indices. The refractive index of glass and many optically transmissive plastics is around 1.5 or greater while the refractive index of air is around 1. At such difference in refractive indices, practically all rays in of the light beam striking face 14 will bend toward the prevailing plane of element 16 sufficiently to enable further propagation along direction 98 by means of TIR.

As illustrated in FIG. 10, some light rays entering element 6 through face 14 can propagate directly into pane 4 via the coupling face 16. The optical contact between face 16 and face 100 suppresses refraction towards a surface normal which would normally occur at the air/glass interface of the bare surface of pane 4. As a result, such light rays may enter pane 4 without appreciable changing the propagation direction and can thus maintain the greater-than-TIR incidence angle with respect to face 120. Once reflected from face 120, such rays will also reflect from the free portions of face 100 due to the parallelism of faces 100 and 120.

As further illustrated in FIG. 10, some light rays entering element 6 through face 14 will initially strike face 22 which is opposing face 16. Such rays will reflect from face 22 by means of TIR and will subsequently enter window pane 4 via the coupling area formed by the optical contact of face 16 and face 100. Likewise, due to the suppressed refraction at the light coupling area, such light rays will continue propagating within pane 4 in a waveguide mode.

Light rays propagating in a waveguide mode through window pane 4 may eventually strike the optical interface formed by light extracting element 20 and face 100. Light extracting element 20 decouples such rays from pane 4 and directs them towards viewer's eye 660. In one embodiment, light extracting element 20 may be configured to provide maximum intensity of the extracted light along a surface normal 220. Depending on the application, element 20 may also be configured to emit light from pane 4 in a broad angle of angles with respect to normal 220 or emit a collimated beam towards the viewer. Light extracting element may also be configured to emit light into opposing directions thus providing the viewability of its illuminated areas from both sides of pane 4.

Figure 11:
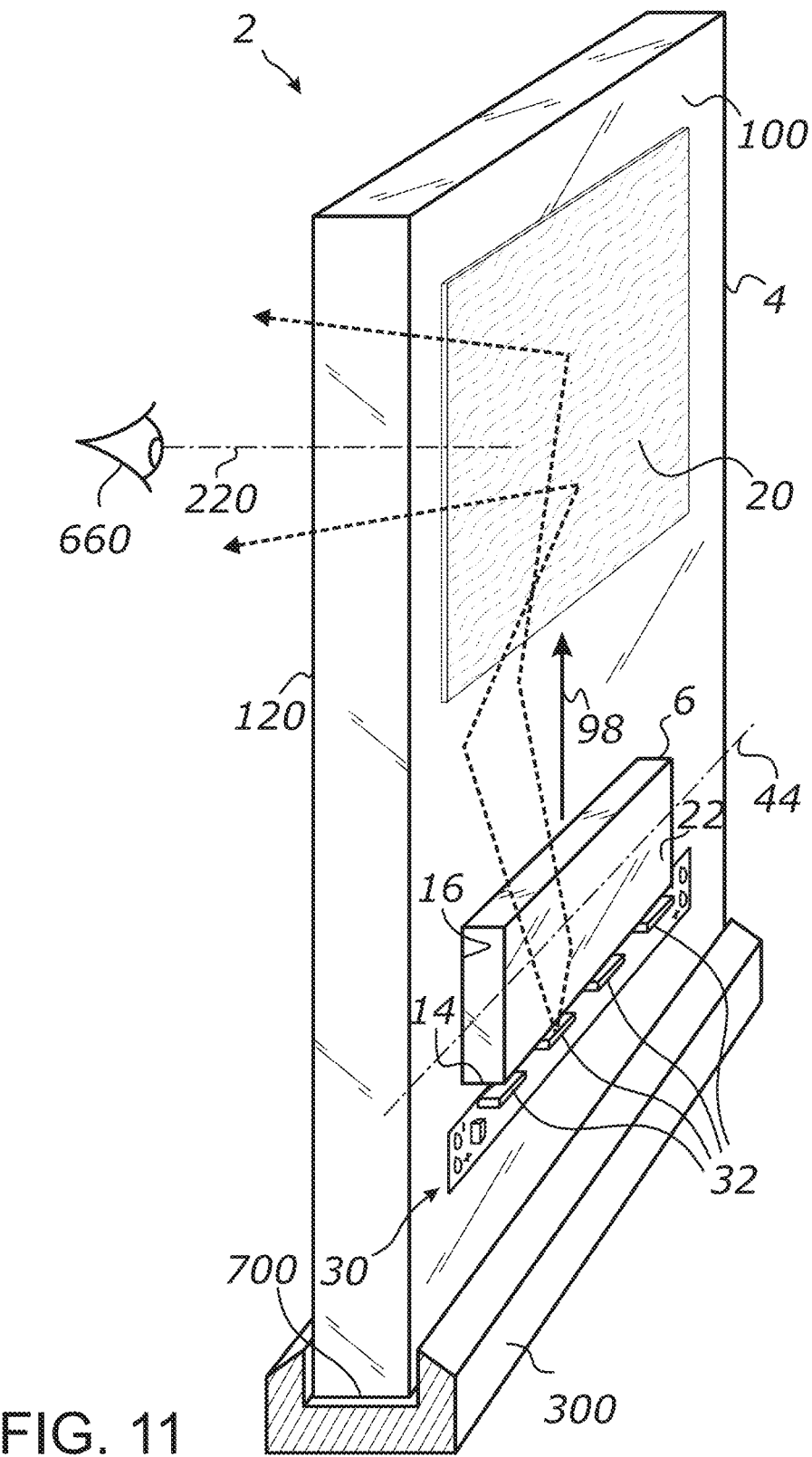
FIG. 11 is a schematic perspective view and raytracing of a face-lit waveguide illumination system, showing a planar light coupling optical element attached to a face of a window pane, according to at least one embodiment of the present invention.

FIG. 11 shows a perspective schematic view of the embodiment illustrated in FIG. 10. Light source 30 is exemplifies by a side emitting flexible LED strip having four individual LEDS 32. Each LED 32 each exemplified by a surface-mount LED device (SMD) which can be implemented in a fairly small package being less than 2 mm in height. The small size of SMD LEDS makes them particularly suitable for coupling to face 14 of element 6. Such side-emitting flexible LED strips are available from various suppliers and may be based on a number of densely or sparsely packed SMD LEDs. For example, one type of side-emitting (also called side-view) LED strips is available from Elemental LED of Emeryville, CA (Stock number EL-IMGSDRIB12V). The side-emitting LED strip may be provided with an adhesive backing which can be used for attaching the strip to face 100 of pane 4.

The light-transmitting rectangular plate or strip plate exemplifying optical element 6 may be attached directly to face 100 using an optical adhesive, optically clear double-sides adhesive tape or curable encapsulant. Alternatively, an intermediate light coupling film or plate may be used as a layer between the plate and pane 4. In a further alternative, optical element 6 may be pressed against face 100 using an external fixture. The external fixture may be attached to frame 300 or to surface 100 of pane 4. A suction device such as a pair of suction cups may also be used for attaching element 6 to face 100. When element 6 is mounted to face 100 with some lasting pressure applied to it, a liquid or gel-type optical encapsulant may be used instead of a fully cured one, in which case element 6 may allow for its easier removability.

Since forming illumination system 2 does not generally require surface penetration into the waveguide plate and either one or both of optical element 6 and light extracting feature 20 may be implemented in the form of an easily attachable and detachable films or decals, this may provide additional utility of system 2 and lower its cost of ownership. Particularly, system 2 may be made easily deployable onto the existing windows inside or outside of the residential, commercial or governmental buildings without the need of undesired changes or invasion to the existing structures. Since at least some types of commercially available films used for in-window signage are easily removable from smooth surfaces, the film representing light extracting feature 20 may be made interchangeable without the need to replace the entire system. Thus, the illuminated pattern, its shape, color, size, and the like may be changed with a relative ease and at low cost by merely removing the light extracting film and laminating another one onto the same or any other area of pane 4.

Figure 12:
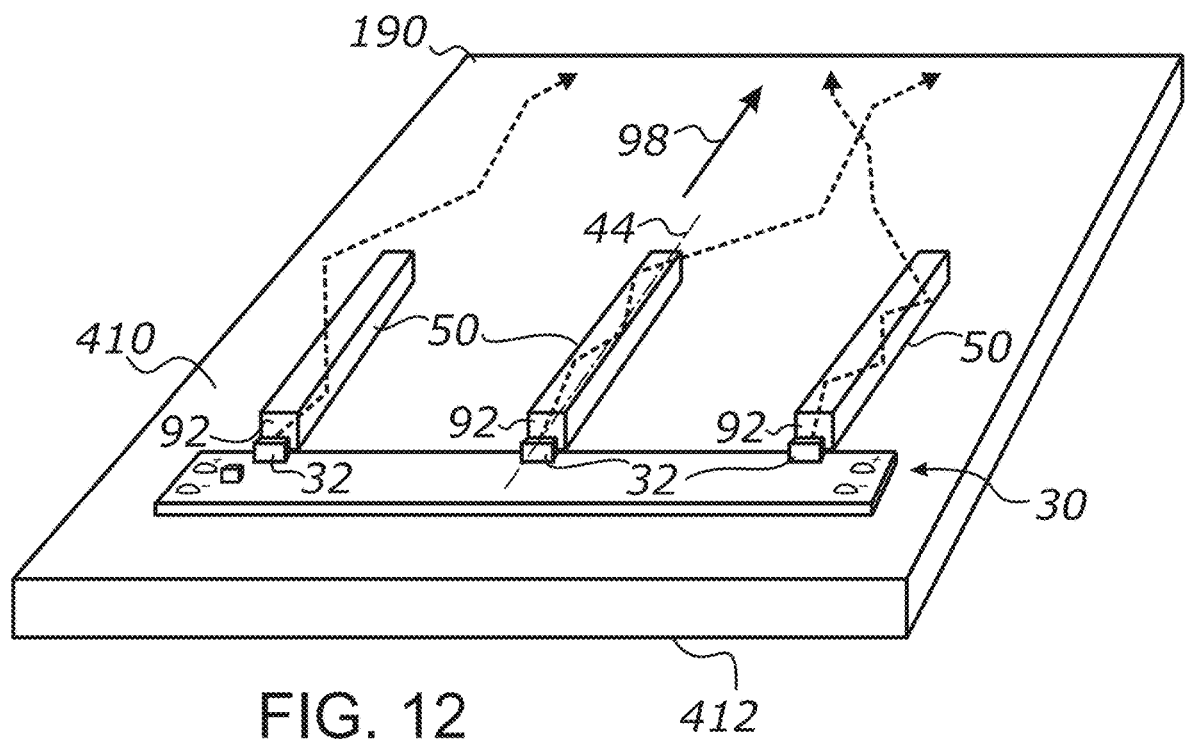
FIG. 12 is a schematic perspective view and raytracing of a face-lit waveguide illumination system portion, showing a plurality of optically transmissive rods or bars attached to a face of a planar slab waveguide, according to at least one embodiment of the present invention.

FIG. 12 schematically illustrates an embodiment of system 2 which employs a plurality of elongated optical elements 50 and where each element 50 has alternative configuration and orientation with respect to direction 98 compared to element 6 illustrated in the preceding Figures.

Referring to FIG. 12, there is provided a planar waveguide 190 defined by opposing broad-area surfaces 410 and 412 and made from a highly transmissive glass or plastic material. Light source 30 of FIG. 12 is exemplified by a side-emitting flexible LED strip similar to that of FIG. 11. Each of LEDs 32 is provided with an individual light coupling optical element 50 which has a form of a linear rod or bar which has a rectangular transversal cross-section and which longitudinal axis 44 extends parallel to the intended prevailing propagation direction 98 of light in pane 4.

Each rectangular bar is made from an optically transmissive dielectric material and has four longitudinal sides each preferably having an optically smooth, polished surface. At least one terminal end of the rectangular bar also preferably has a smooth surface 92 configured for light input. One longitudinal side of each element 50 is disposed in optical contact with surface 410 of waveguide 190 and is configured for light output while the other three longitudinal sides are exposed to air and configured for reflecting light by means of TIR.

Such configuration and orientation of elements 50 allows each such element to receive light by its surface 92 and guide such light along its longitudinal axis 44 by reflections from the three exposed sides in response to TIR and optical transmission. Each element 50 therefore acts a light guide or light pipe for at least some rays which are not initially propagating towards the light output side. The light output side of element 50 provides an outlet through which light can leak from element 50 into waveguide 190 along the propagation path.

An advantage of implementing optical element 50 in the form of a light pipe may be that such configuration may allow for lower-loss light input into a thinner waveguide compared to, for example, the configuration illustrated in FIG. 11. The use of arrangement of optical element 6 and LED-based source 30 of FIG. 11 for injecting light into a waveguide which have a thickness considerable less than the thickness of the plate representing element 6 may be problematic. This problem arises from the fact that a sizeable fraction of light may escape from element 6 through its face which is opposing the light input face 14. In contrast, the optical element 50 of FIG. 11 may be configured to inject most light into the underlying waveguide even when the thickness of the waveguide is less than that of the respective rectangular rod. Since each LED 32 emits a light beam which has some divergence in the plane of waveguide 190, at least a portion of said beam will escape from the TIR envelope of element 50 at each passage of the beam through the light output side of element 50. The longer the longitudinal extent of the rectangular rod forming element 50, the more light will be injected into waveguide 190 and the less light will remain within the TIR envelope.

Figure 13:
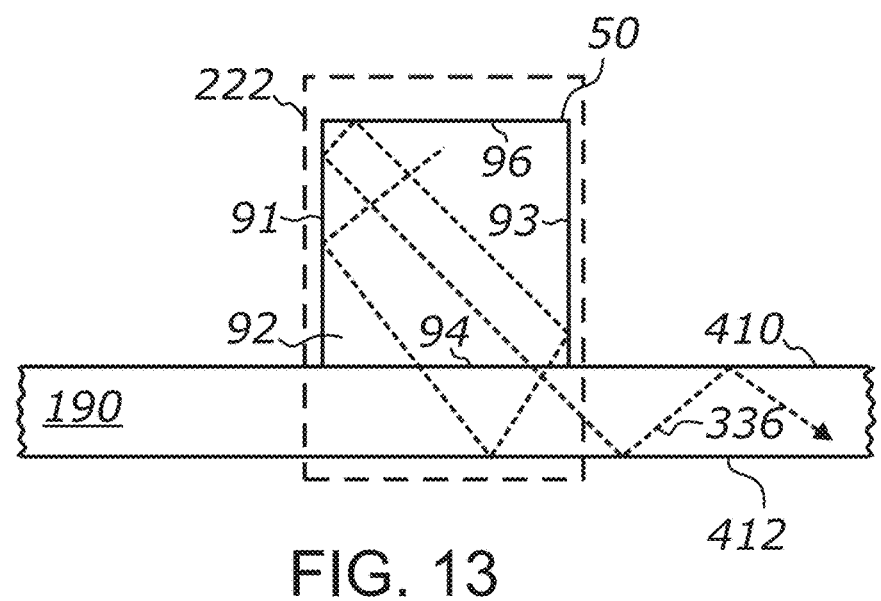
FIG. 13 is a schematic cross-sectional view of a face-lit waveguide illumination system portion, illustrating light injection into a thin planar waveguide, according to at least one embodiment of the present invention.

The operation of light-guiding optical element 50 is further illustrated in FIG. 13 by example of light injection into waveguide 190 which thickness is less than the transversal dimensions of the rectangular light transmitting bar forming element 50.

Referring to FIG. 13, light coupling optical element 50 is shown in a transversal cross-section. A face 94 of element 50 represents the side of the respective rectangular bar which is disposed in the optical contact with surface 410 of waveguide 190. A face 96 of element 50 represents an opposing side of the bar. Faces 91 and 93 respectively represent the other two sides of the bar in the transversal cross-section.

A light ray 336 exemplifies light received by element 50 from an individual LED 32 of light source 30. It will be appreciated that the optical contact of face 94 with surface 410 provides for a generally unimpeded light passage from optical element 50 into waveguide 190 and back. At the same time, it will be appreciated that the other three sides of element 50 as well as the portion of surface 412 of the waveguide immediately below element 50 form a TIR envelope (indicated by a dashed box area 222 in FIG. 13). Such TIR envelope confines ray 336 so that such ray propagates along the longitudinal axis of element 50 undergoing TIR from said faces and from surface 412. Ray 336 continues propagating trough the body of element 50 until it reached an opening between face 93 and surface 412. Ray 336 thus eventually escapes from envelope 222 and continues its propagation in the body of waveguide 190 by means of TIR, which completes the injection of such ray into the waveguide.

It will be appreciated that, when all rays emitted by the respective LED 32 are considered, the prevailing direction of light propagation will be generally parallel to the longitudinal axis of the rectangular rod forming optical element 50. While some rays may reach the opposite end of the rod and escape from system 2 without being injected into waveguide 190, the percentage of such rays with respect to the entire emitted beam can be made relatively small.

There are several factors determining the amount of light which may remain in element 6 uncoupled into waveguide 190. One such factor is the relation of the thickness of waveguide 190 to the cross-sectional dimensions of optical element 50 as it determines the relative size of the gap in envelope 222 available for rays to escape. Another factor is the relative length of element 50 with respect to the waveguide thickness and with respect to the transversal dimensions of the optical element. Generally, the longer the linear element 50 is the higher percentage of light may escape from it. A yet another factor determining the escape rate from optical element 50 is the initial divergence of light beam emitted by the respective LED 32. A greater divergence angle, especially in the plane of waveguide 190, will generally result in a higher rate of light escape from optical element 50.

Referring to FIG. 12, the beam divergence should also be accounted for when selecting the spacing between adjacent pairs of LEDs 32 and optical elements 50. Particularly, it may be preferred that such spacing be sufficient to generally prevent or minimize interference between the adjacent LED-coupler pairs. In other words, light injected into waveguide 190 through one optical element 50 should not enter into another optical element 50 since it may cause ray decoupling and loss of illumination efficiency.

Figure 14:
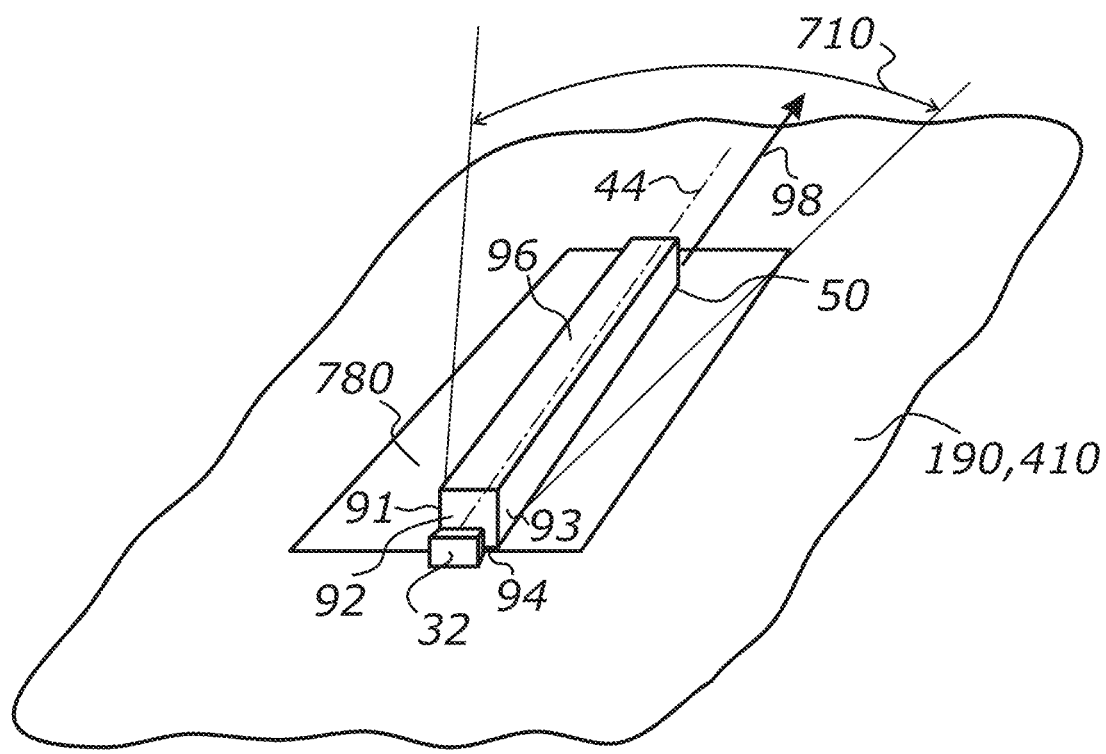
FIG. 14 is a schematic view of a face-lit waveguide illumination system portion, illustrating an exemplary method of attaching a light coupling optical element to a face of a planar waveguide, according to at least one embodiment of the present invention.

FIG. 14 provides a further illustration of the operation of rod-shaped optical element 50. A cone 710 denotes the divergence of the light beam in the plane of surface 410 as it escapes from element 50 into the underlying waveguide. LED 32 illuminating light input face 92 of element 50 emits light generally towards direction 98. Obviously, even when such light further undergoes multiple reflections within optical element 50 and enters into waveguide mode, the general propagation direction will be preserved. Thus, light injected into waveguide 190 using the above-described principles will continue propagating through the body of waveguide 190 along direction 98 and towards the predetermined location of the waveguide.

FIG. 14 also illustrates an exemplary method of attaching optical element 50 to surface 410 of waveguide 190. Accordingly, a rectangular piece of light transmitting film 780 is laminated onto surface 410 with a good optical contact. In a non-limiting example, the lamination may be done using a low-tack adhesive or static cling properties of the film. Optical element 6 may be attached to film 780 using a relatively high-tack adhesive. The adhesive may be applied in a liquid form or in the form of a double-sided adhesive tape which should have sufficient optical clarity.

In case of using a low-tack adhesive of static cling for attaching film 780 to surface 410, the film may generally have a lower peel resistance than optical element 50. Therefore, in one embodiment, the area of film 780 can be made substantially larger than the area of the respective face 94 of optical element 50 which may provide a more reliable attachment of the film to the face of waveguide 190.

Figure 15A:
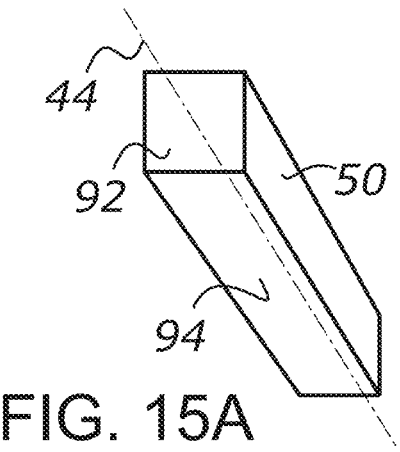
FIG. 15A through FIG. 15F, illustrate various exemplary configurations of a linear optical element, according to at least some embodiments of the present invention.
Figure 15B:
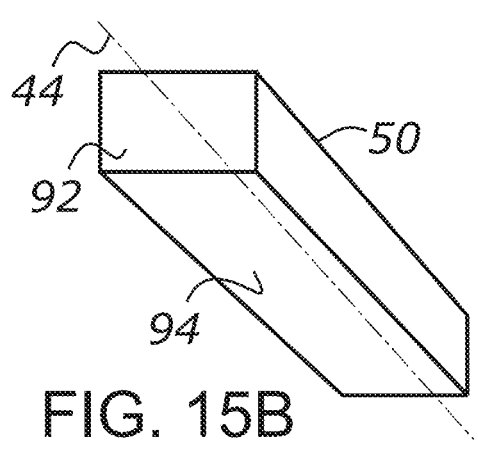

FIG. 15A through FIG. 15F illustrate various exemplary configurations of linear optical elements 50 of FIG. 12. Particularly, FIG. 15A shows optical element shaped in the form of a rod having a square cross-section. In FIG. 15B, optical element 50 has the shape of a rectangular bar. While light output face 94 of element 50 is shown to correspond to a longer side of the corresponding rectangle, it is noted that any of the shorter sides may be designated for this.

Figure 15C:
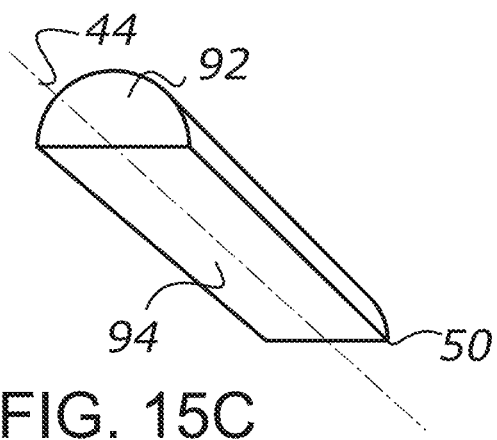
Figure 15D:
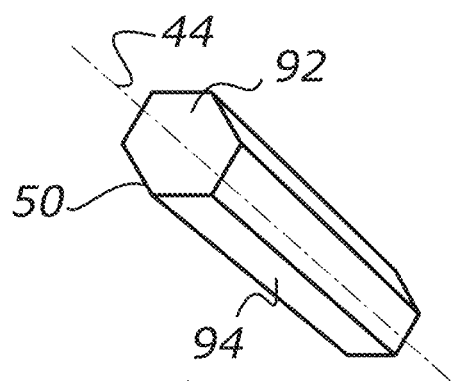
Figure 15E:
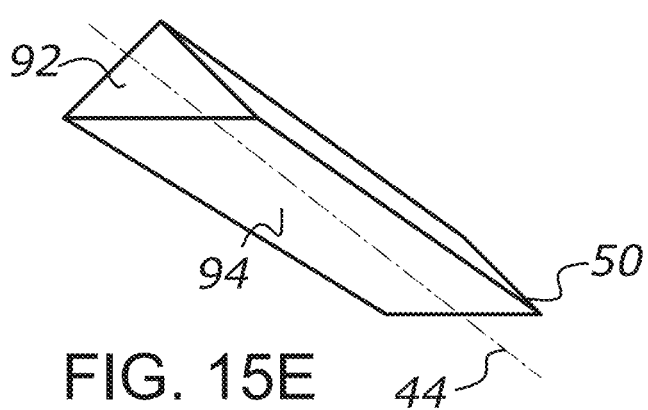
Figure 15F:
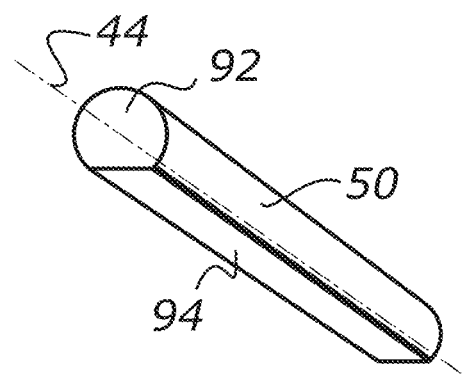

FIG. 15C shows optical element 50 having the form of a half-round rod with one terminal end designated as light input face 92 and the planar longitudinal side designated as light output face 94. Optical element 50 having a hexagonal rod configuration is shown in FIG. 15D. In FIG. 15E, optical element 50 is formed by a triangular optically transmissive. By way of examples and not limitations, the respective transversal cross-section may have the shape of a right-angle isosceles triangle or an equilateral triangle. However, it should be understood that such cross-section may be represented by any other type of triangle. In FIG. 15F, optical element 50 is formed by a portion of a generally round rod where said rod has a planar longitudinal surface portion which is configured as light output face 94.

It is noted, however, that possible variations of the transversal cross-sectional shapes of linear optical element 50 are not limited to the shapes illustrated in FIG. 15A through FIG. 15F or other preceding drawings. Optical element 50 may have an elongated configuration which transversal cross-section may approximate other common two-dimensional shapes including but not limited to pentagons, octagons, trapezoids, circles, circular segments or sectors, ovals, and the like.

Figure 16:
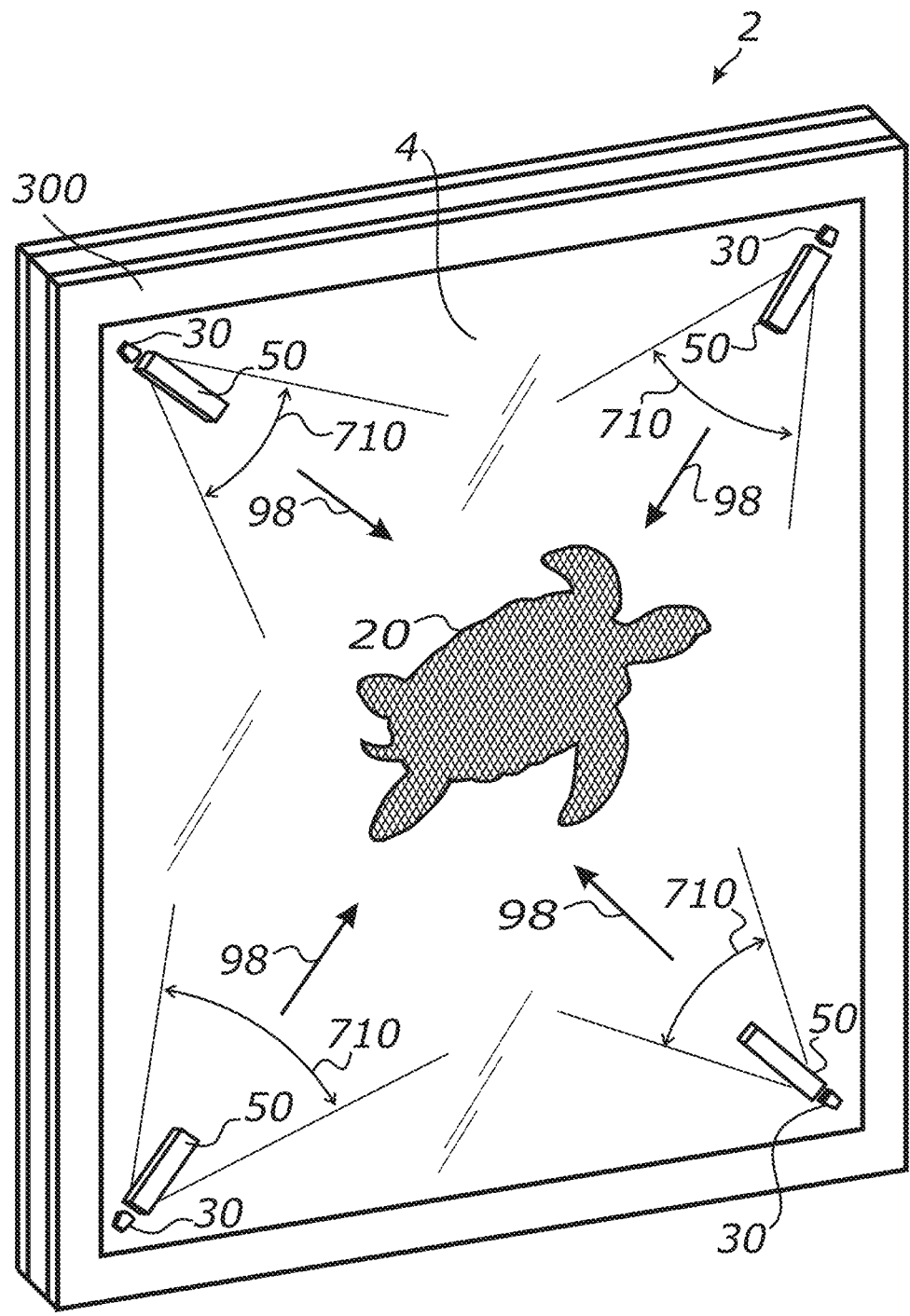
FIG. 16 illustrate an exemplary arrangement of optical elements and light sources with respect to a face of a window pane, according to at least one embodiment of the present invention.

FIG. 16 illustrates an embodiment of face-lit illumination system 2 which employs rod-shaped optical element 50. The respective LED-based light sources 30 and elements 50 are grouped pairwise to create individual light emitting/coupling structures. Each pair is positioned at the respective corner of framed window pane 4 and is configured to inject light into the pane. Each optical element is positioned so that it directs light towards the respective direction 98 and within the respective angular cone 710 in the plane of pane 4. All directions 98 converge towards the center of pane 4 so that the individual beams injected by source-coupler pairs are directed towards the central area of the window where light extracting feature 20 is located. Image-carrying light extracting area 20 is configured to extract light from pane 4 and direct the extracted light outwardly.

Figure 17:
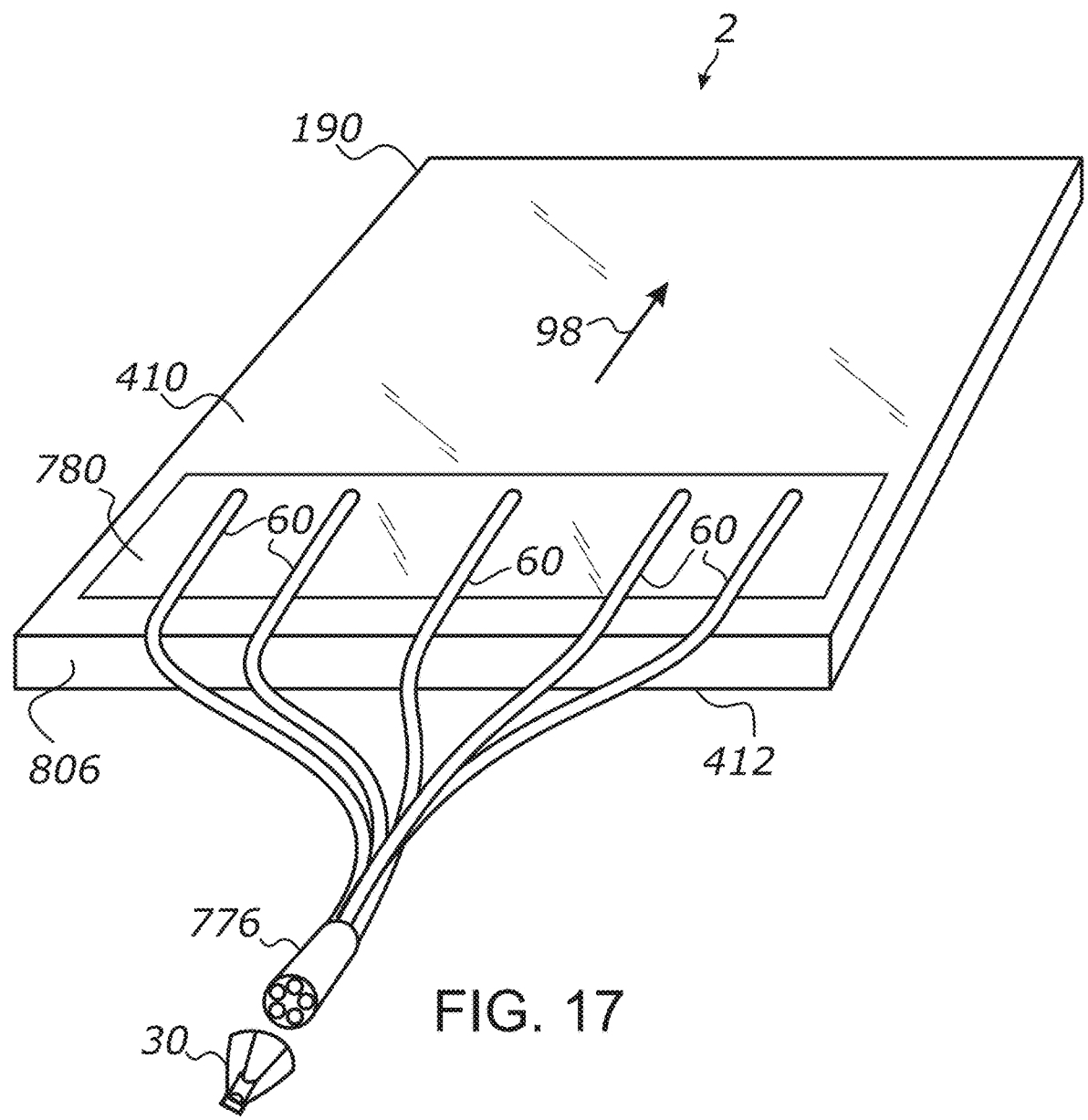
FIG. 17 is a schematic perspective view and raytracing of a face-lit waveguide illumination system portion, showing a plurality of optical fibers attached to a face of a planar slab waveguide, according to at least one embodiment of the present invention.

FIG. 17 depicts an embodiment in which light emitted by a single light source 30 is coupled into planar waveguide 190 though face 419 using a bundle 776 of optical fibers 60.

Referring to FIG. 17, light source 30 can be any light emitting device providing a beam of light that can be injected into a round aperture of the fiber bundle 776. Particularly, it may be is exemplified by a high brightness LED coupled to a collimating or concentrating optic which shapes the beam emitted by the LED according to the numeric aperture of the fibers 60 in bundle 776. By way of example and not limitation, the LED optic may be represented by a 15-mm, hex shaped concentrator lens manufactured by Polymers Optics (Polymer Part #180) coupling into planar waveguide 190. Such lens produces a 6 mm beam diameter at 14.5 mm distance in front of the lens and is designed particularly for inserting LED beams into fiber bundles.

Fiber bundle 776 includes five optical fibers 60. In a non-limiting example, optical fibers 60 may be about 2 mm diameter each. The entrance aperture of bundle 776 is located at a prescribed location from the LED optic (e.g., approximately 14.5 mm in Polymer Optics concentrator lens is used) to intercept at least a substantial part of light emitted by source 30.

Fibers 60 are distributed along an edge 806 of waveguide 190 and attached to surface 410 by means of light transmitting film 780. Film 780 is laminated onto surface 410 with a good optical contact and sufficient adhesion to resist peeling off while holding fibers 60. Fibers 60 are glued to film 780 in such a manner that there at least a portion of the surface of each fiber has sufficient optical contact with film 780 to enable light leakage into waveguide 190. In one embodiment, the ends of each fiber 60 may be provided with a planar surface portion such as, for example, is shown in FIG. 15F. In one embodiment, the end portion of each fiber may be flattened to facilitate bonding to film 780 and optical contact.

Each fiber 60 is straightened in the light coupling area and aligned perpendicularly to edge 806 so that the fiber ends attached to film 780 are generally parallel to each other and point towards the intended prevailing light propagation direction 98.

The operation of the embodiment illustrated in FIG. 17 will be apparent in view of the above described embodiment of FIG. 12. Accordingly, light emitted by source 30 and injected into fiber bundle 776 propagates in each fiber 60 in a waveguide mode without appreciable leakage until the area of film 780 is reached. The optical contact areas that each fiber 60 forms with film 780 result in light escape from the fibers and injection of such light into waveguide 190. Moreover, it will be appreciated that, despite the divergence of individual light beams injected by each fiber 60, the prevailing propagation direction 98 of the injected light in waveguide 190 will be generally parallel to the longitudinal axes of the straight ends of the fibers. Accordingly, suitable light extracting features may be positioned along direction 98 to extract light from a different location of waveguide 190.

The foregoing embodiments have been described upon the case where the planar waveguide was exemplified by a highly transparent plate and a window pane which has a relatively high optical clarity. However, this invention is not limited to this and may be applied to the case where a relatively low-clarity or even translucent panel or plate may be used for distributing and emitting light injected through the face of such plate or panel. Many common objects may fall under this category, for example partially-transmitting glass or plastic elements of building interior or exterior, certain glass or plastic materials used for storefronts or building facades may have intrinsic light-scattering properties, etched door windows or glass table tops, etc. Alternatively, or in addition to that, various commercially available sheets of optically transmissive materials may have surface texture that scatters light propagating in the waveguide mode. Accordingly, although the distance of light propagation is shortened with reduced transparency, at least some of such plates, panels or sheets may act as face-lit planar waveguides extracting light along the entire propagation path and provide a soft glow from the entire surface or at least its portion adjacent to or surrounding the optical element 6. Thus, lower-clarity planar optical waveguides may still be employed for system 2 in the manner proposed without the departure from the scope of this invention.

The structure and operating principles of the above described embodiments of face-lit illumination systems may be applied without limitations to any common glass or plastic objects which have the appropriate structure and sufficient optical clarity or transmissivity to act as planar waveguide. Examples include but are not limited to glass table tops, back-surface mirrors, glass or transparent-plastic doors or inserts of furniture articles, screens, light transmitting sheets employed in large-area lighting panels, light diffusing sheets, and the like. For instance, one or more optical elements 6 or 92 may be attached to a face of a glass table top or a vanity mirror. Each of the optical elements 6 or 92 may be provided with one or more light source 30 in order to insert light into the respective glass slab or panel and force its lateral propagation in a waveguide mode. A light extracting film may be attached to the face of such glass or panel in another location to extract light towards an observer. Either one or all of the attached optical components of system 2 may be made removable from the glass surface and may also be further made repositionable on the same or different surface. Additionally, different types of light coupling optical elements and light sources may be used within the same system thus providing even greater degree of control over system configuration and light emission.

This invention is not limited in application to the planar light guiding panels, sheetforms or slabs having strictly parallel broad surfaces, but can also be applied to the case where the planar light guide has a wedge configuration which may be exemplified by pane 4 being slightly tapered towards one of the edges. A tapered configuration of the planar waveguide may be advantageously selected, for example, for an improved light extraction where light can be injected by elements 6 or 50 into the light guide along a direction pointing generally towards the tapered edge.

Furthermore, system 2 may incorporate any number of auxiliary layers serving various purposes, such as, for example, providing additional mechanical strength, environmental resistance, peel resistance, improved visual appearance, color, etc. Any optical interface between a layer formed by a lower refractive index transmissive medium and a layer formed by a higher refractive index transmissive medium may also be provided with an intermediate optically transmissive layer, for example, for promoting the optical contact or adhesion between the layers. The intermediate layer should preferably have a refractive index which is greater than the lower of the two refractive indices at the given optical interface.

System 2 may further incorporate various color filters, inks, dyes or other devices or substances that change the color of the extracted light. System 2 may also incorporate polarizing elements, fluorescent elements, fluorescent elements, light scattering or diffusing elements and the like, which may be provided as separate layers or incorporated into the bulk material of the optical elements of source 30, the body of optical elements 6 or 50, pane 4, film 8 or its features 20.

Further details of operation of waveguide illumination system 2 shown in the drawing figures as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of making a light guide illumination system, comprising:

providing an optically transmissive sheet having a first broad-area surface substantially coextensive with a first side of the optically transmissive sheet, a second broad-area surface substantially coextensive with a second side of the optically transmissive sheet and extending parallel to the first broad-area surface, a first edge, an opposing second edge, a light coupling area located at or near the first edge, and a two-dimensional light extraction area located on at least one of the first and second broad-area surfaces and at a distance from the first edge, wherein the two-dimensional light extraction area comprises a plurality of light extraction features formed in or on one of the first and second broad-area surfaces with a variable density and configured for extracting light from the optically transmissive sheet, and wherein the optically transmissive sheet is configured to propagate light from the light coupling area towards the two-dimensional light extraction area using optical transmission and total internal reflection from both the first and second broad-area surfaces;

providing an LED strip comprising a strip of heat-conducting printed circuit and a linear array of electrically interconnected side-emitting LED packages mounted to a major surface of the strip of heat-conducting printed circuit such that a plane of a light emitting aperture of each of the electrically interconnected side-emitting LED packages is oriented perpendicular to the major surface;

providing a broad-area reflector;

positioning the broad-area reflector at the second broad-area surface parallel to the optically transmissive sheet;

aligning the LED strip parallel to the first edge; and positioning the LED strip at or near the first edge such that the major surface extends generally parallel to the first and second broad-area surfaces and at least a substantial portion of the major surface is disposed in a space between the first and second edges, wherein a density of the light extraction features within the two-dimensional light extraction area increases with a distance from the light coupling area.

2. The method of making a light guide illumination system as recited in claim 1, further comprising providing an opaque light masking element and positioning the opaque light masking element at the first broad-area surface parallel to the optically transmissive sheet.

3. The method of making a light guide illumination system as recited in claim 2, wherein the opaque light masking element is covering at least a significant portion of the light coupling area and is configured to reflect light emerging from the optically transmissive sheet.

4. The method of making a light guide illumination system as recited in claim 2, wherein the opaque light masking element is covering at least a significant portion of the light coupling area and is configured to absorb at least a significant portion of light emerging from the optically transmissive sheet.

5. The method of making a light guide illumination system as recited in claim 1, wherein the light coupling area comprises a linear array of optically transmissive light coupling elements formed in the optically transmissive sheet and distributed along the first edge according to a regular pattern.

6. The method of making a light guide illumination system as recited in claim 5, wherein at least one of the optically transmissive light coupling elements is formed by a rounded ridge oriented perpendicular to a longitudinal axis of the strip of heat-conducting printed circuit.

7. The method of making a light guide illumination system as recited in claim 5, further comprising disposing at least one of the optically transmissive light coupling elements in registration with respect to one of the electrically interconnected side-emitting LED packages.

8. The method of making a light guide illumination system as recited in claim 1, further comprising positioning a flexible optically transmissive prism film parallel to the optically transmissive sheet, wherein the flexible optically transmissive prism film comprises an array of parallel linear prisms each defining a pair of opposing side walls sloped at an angle of less than 90 degrees with respect to the a plane of the flexible optically transmissive prism film.

9. The method of making a light guide illumination system as recited in claim 1, further comprising positioning a flexible multi-layer optically transmissive prism film parallel to the optically transmissive sheet, wherein the flexible multi-layer optically transmissive prism film comprises a smooth outer surface, a first prism film, an adhesive layer, and a second prism film bonded to the first prism film using the adhesive layer, wherein the first prism film comprises a first array of parallel linear prisms, wherein the second prism film comprises a second array of parallel linear prisms facing the first prism film, and wherein each of the parallel linear prisms of the first and second arrays of parallel linear prisms defines a pair of opposing side walls sloped at an angle of less than 90 degrees with respect to the smooth outer surface.

10. The method of making a light guide illumination system as recited in claim 9, wherein a first layer of the flexible multi-layer optically transmissive prism film has a first refractive index, and wherein a second layer of the flexible multi-layer optically transmissive prism film has a second refractive index which is different than the first refractive index.

11. The method of making a light guide illumination system as recited in claim 1, further comprising positioning a flexible multi-layer optically transmissive prism film parallel to and in an energy receiving relationship with respect to the optically transmissive sheet, wherein the flexible multi-layer optically transmissive prism film comprises a smooth outer surface, a first prism film, an adhesive layer, and a second prism film bonded to the first prism film, wherein the first prism film comprises a first array of parallel linear prisms, wherein the second prism film comprises a second array of parallel linear prisms facing the first prism film, and wherein each of the parallel linear prisms of the first and second arrays of parallel linear prisms defines a pair of opposing side walls sloped at an angle of less than 90 degrees with respect to the smooth outer surface.

12. The method of making a light guide illumination system as recited in claim 1, further comprising positioning a fluorescent film material along the optically transmissive sheet, wherein the fluorescent film material is approximately coextensive with the two-dimensional light extraction area, comprises light scattering features, and is configured to convert light from a first wavelength of visible spectrum to a second wavelength of visible spectrum which is longer than the first wavelength.

13. The method of making a light guide illumination system as recited in claim 1, wherein the optically transmissive sheet comprises a highly elongated light coupling element formed from an optically transmissive dielectric material and longitudinally extending parallel to the strip of heat-conducting printed circuit.

14. The method of making a light guide illumination system as recited in claim 13, wherein the strip of heat-conducting printed circuit is formed from a flexible material, and wherein a height of at least one of the electrically interconnected side-emitting LED packages is less than 2 mm.

15. The method of making a light guide illumination system as recited in claim 1, further comprising bonding the strip of heat-conducting printed circuit to the first broad-area surface using adhesive.

16. The method of making a light guide illumination system as recited in claim 1, further comprising removably bonding an optical element to the first broad-area surface using a relatively low-tack adhesive.

17. The method of making a light guide illumination system as recited in claim 1, further comprising bonding an opaque film material to the first broad-area surface using a relatively low-tack adhesive.

18. The method of making a light guide illumination system as recited in claim 1, further comprising bonding an opaque film material to the first broad-area surface using an adhesive material.

19. The method of making a light guide illumination system as recited in claim 1, further comprising providing a linear structural channel, and at least partially encasing the linear array of electrically interconnected side-emitting LED packages withing within the linear structural channel.

20. The method of making a light guide illumination system as recited in claim 1, wherein at least one of the electrically interconnected side-emitting LED packages is located at an edge of the strip of heat-conducting printed circuit.

21. The method of making a light guide illumination system as recited in claim 1, wherein at least one of the side-emitting LED packages is located at an edge of the strip of heat-conducting printed circuit and has a height which is less than 2 mm.

22. The method of making a light guide illumination system as recited in claim 1, wherein at least a first one of the electrically interconnected side-emitting LED packages is configured to emit light in a different color than a different second one of the electrically interconnected side-emitting LED packages, and wherein each of the first and second ones of the electrically interconnected side-emitting LED packages is configured to emit light with a variable intensity.

23. The method of making a light guide illumination system as recited in claim 1, wherein at least a first one of the electrically interconnected side-emitting LED packages is configured to emit light in a different color than a different second one of the electrically interconnected side-emitting LED packages.

24. The method of making a light guide illumination system as recited in claim 1, wherein at least one of the electrically interconnected side-emitting LED packages is configured to emit light with a variable intensity.

25. A method of making a light guide illumination system, comprising:
providing an optically transmissive sheet having a first broad-area surface substantially coextensive with a first side of the optically transmissive sheet, a second broad-area surface substantially coextensive with a second side of the optically transmissive sheet and extending parallel to the first broad-area surface, a first edge, an opposing second edge, a light coupling area located at or near the first edge, and a two-dimensional light extraction area located on at least one of the first and second broad-area surfaces and at a distance from the first edge;
providing a heat conductive substrate comprising a strip of printed circuit and a linear array of electrically interconnected side-emitting LED packages mounted to a major surface of the strip of printed circuit such that a plane of a light emitting aperture of each of the electrically interconnected side-emitting LED packages is oriented perpendicular to the major surface;
positioning the heat conductive substrate at or near the first edge such that the strip of printed circuit is aligned parallel to the first edge, the light emitting aperture of each of the electrically interconnected side-emitting LED packages is facing the first edge, the major surface extends generally parallel to the first and second broad-area surfaces, and at least a substantial portion of the heat conductive substrate is located in a space between the first and second edges;

providing a broad-area reflector; and positioning the broad-area reflector at the second broad-area surface and parallel to the optically transmissive sheet, wherein the two-dimensional light extraction area comprises a plurality of light extraction features formed in or on one of the first and second broad-area surfaces with a variable density and configured for extracting light from the optically transmissive sheet, wherein a density of the light extraction features within the two-dimensional light extraction area increases with a distance from the light coupling area, and wherein the optically transmissive sheet is configured to propagate light from the light coupling area towards the two-dimensional light extraction area using optical transmission and total internal reflection.

26. The method of making a light guide illumination system as recited in claim 25, further comprising providing an opaque light masking element and positioning the opaque light masking element at the first broad-area surface parallel to the optically transmissive sheet.

27. The method of making a light guide illumination system as recited in claim 26, wherein the opaque light masking element is covering at least a significant portion of the light coupling area and is configured to reflect light emerging from the optically transmissive sheet.

28. The method of making a light guide illumination system as recited in claim 26, wherein the opaque light masking element is covering at least a significant portion of the light coupling area and is configured to absorb at least a significant portion of light emerging from the optically transmissive sheet.

29. The method of making a light guide illumination system as recited in claim 25, wherein the light coupling area comprises a linear array of optically transmissive light coupling elements formed in the optically transmissive sheet and distributed along the first edge according to a regular pattern.

30. The method of making a light guide illumination system as recited in claim 29, wherein at least one of the optically transmissive light coupling elements is formed by a rounded ridge oriented perpendicular to a longitudinal axis of the strip of printed circuit.

31. The method of making a light guide illumination system as recited in claim 29, further comprising disposing at least one of the optically transmissive light coupling elements in registration with respect to one of the electrically interconnected side-emitting LED packages.

32. The method of making a light guide illumination system as recited in claim 25, further comprising positioning a flexible optically transmissive prism film parallel to the optically transmissive sheet, wherein the flexible optically transmissive prism film comprises an array of parallel linear prisms each defining a pair of opposing side walls sloped at an angle of less than 90 degrees with respect to a plane of the flexible optically transmissive prism film.

33. The method of making a light guide illumination system as recited in claim 25, further comprising positioning a fluorescent film material along the optically transmissive sheet, wherein the fluorescent film material is approximately coextensive with the two-dimensional light extraction area, comprises light scattering features, and is configured to convert light from a first wavelength of visible spectrum to a second wavelength of visible spectrum which is longer than the first wavelength.

34. The method of making a light guide illumination system as recited in claim 25, wherein the optically transmissive sheet comprises a highly elongated light coupling element formed from an optically transmissive dielectric material and longitudinally extending parallel to the strip of printed circuit.

35. The method of making a light guide illumination system as recited in claim 25, further comprising bonding the strip of printed circuit to the first broad-area surface using adhesive.

36. The method of making a light guide illumination system as recited in claim 25, further comprising bonding an opaque film material to the first broad-area surface using an adhesive material.

37. The method of making a light guide illumination system as recited in claim 25, further comprising providing a linear structural channel, and at least partially encasing the linear array of electrically interconnected side-emitting LED packages within the linear structural channel.

38. The method of making a light guide illumination system as recited in claim 25, wherein at least one of the electrically interconnected side-emitting LED packages is located at an edge of the strip of printed circuit.

39. The method of making a light guide illumination system as recited in claim 25, wherein at least one of the side-emitting LED packages is located at an edge of the strip of printed circuit and has a height which is less than 2 mm.

40. The method of making a light guide illumination system as recited in claim 25, wherein at least one of the electrically interconnected side-emitting LED packages is configured to emit light with a variable intensity.

* * * * *